(12) United States Patent
Tamiya

(10) Patent No.: US 9,689,662 B2
(45) Date of Patent: Jun. 27, 2017

(54) DISPLACEMENT DETECTING DEVICE AND SCALE

(71) Applicant: DMG MORI SEIKI CO., LTD., Yamatokoriyama-shi, Nara (JP)

(72) Inventor: Hideaki Tamiya, Isehara (JP)

(73) Assignee: DMG MORI SEIKI CO., LTD., Yamatokoriyama-shi (JP)

( * ) Notice: Subject to any disclaimer, the term of this patent is extended or adjusted under 35 U.S.C. 154(b) by 877 days.

(21) Appl. No.: 14/093,971

(22) Filed: Dec. 2, 2013

(65) Prior Publication Data

US 2014/0195193 A1 Jul. 10, 2014

(30) Foreign Application Priority Data

Dec. 10, 2012 (JP) ................................. 2012-268988
Oct. 29, 2013 (JP) ................................. 2013-224094

(51) Int. Cl.
G01B 11/00 (2006.01)
G01D 5/347 (2006.01)
G01D 5/38 (2006.01)

(52) U.S. Cl.
CPC ......... *G01B 11/00* (2013.01); *G01D 5/34746* (2013.01); *G01D 5/34792* (2013.01); *G01D 5/38* (2013.01); *G01D 5/34723* (2013.01)

(58) Field of Classification Search
CPC .. G01D 5/34792; G01D 5/38; G01D 5/34746; G01D 5/34723; G01B 11/00
USPC ....................................................... 702/150
See application file for complete search history.

(56) References Cited

U.S. PATENT DOCUMENTS

| 5,506,681 A * | 4/1996 | Igaki | G01D 5/366 250/237 G |
| 2004/0095583 A1 | 5/2004 | Tamiya et al. | |
| 2004/0173735 A1 | 9/2004 | Williams et al. | |
| 2011/0218760 A1* | 9/2011 | Takahama et al. | G01P 3/64 702/150 |
| 2011/0310396 A1 | 12/2011 | Tamiya | |

FOREIGN PATENT DOCUMENTS

JP A-2004-170153 6/2004

OTHER PUBLICATIONS

Feb. 13, 2017 Extended Search Report issued in European Patent Application No. 13195899.3.

* cited by examiner

*Primary Examiner* — Sujoy Kundu
*Assistant Examiner* — Lynda Dinh
(74) *Attorney, Agent, or Firm* — Oliff PLC

(57) ABSTRACT

A scale has marks whose pitch interval changes along a measurement direction in a manner that can be approximated to a quadratic or higher-order polynomial. A comparing unit calculates a difference between first relative position information and second relative position information per unit displacement in a position where a first displacement detecting unit is arranged. Then, an absolute position computing unit computes an absolute position in the measurement direction with respect to the scale based on absolute position information and the relative position information of at least one of the first relative position information and the second relative position information, and outputs the absolute position.

11 Claims, 20 Drawing Sheets

FIG. 16

CORRECTION VALUE TABLE (nm)

| | | CORRECTION VALUE (nm) |
|---|---|---|
| ABSOLUTE POSITION (nm) | 1 | 0.5 |
| | 2 | 0.3 |
| | 3 | 0.1 |
| | 4 | 0.2 |
| | 5 | 0.1 |
| | . | . |
| | . | . |
| | . | . |
| | . | . |
| | . | . |
| | . | . |
| | . | . |
| | . | . |

FIG. 18

FIRST MEASUREMENT DIRECTION X1 CORRECTION VALUE TABLE (nm)

| | | SECOND MEASUREMENT DIRECTION Y1 ABSOLUTE POSITION (nm) | | | | | | | | | |
|---|---|---|---|---|---|---|---|---|---|---|---|
| | | 1 | 2 | 3 | 4 | 5 | 6 | 7 | · | · | · |
| FOIRST MEASUREMENT DIRECTION X1 ABSOLUTE POSITION (nm) | 1 | 0.1 | 0.2 | 0.3 | 0.3 | 0.2 | 0.2 | 0.1 | · | · | · |
| | 2 | 0.1 | 0.1 | 0.2 | 0.1 | 0.2 | 0.1 | 0.1 | · | · | · |
| | 3 | 0.2 | 0.2 | 0.1 | 0.2 | 0.1 | 0.2 | 0.2 | · | · | · |
| | 4 | 0.3 | 0.3 | 0.2 | 0.3 | 0.2 | 0.2 | 0.3 | · | · | · |
| | 5 | 0.4 | 0.3 | 0.3 | 0.4 | 0.3 | 0.1 | 0.1 | · | · | · |
| | 6 | 0.5 | 0.4 | 0.4 | 0.5 | 0.4 | 0.3 | 0.2 | · | · | · |
| | 7 | 0.1 | 0.3 | 0.2 | 0.3 | 0.3 | 0.4 | 0.3 | · | · | · |
| | · | · | · | · | · | · | · | · | · | · | · |
| | · | · | · | · | · | · | · | · | · | · | · |
| | · | · | · | · | · | · | · | · | · | · | · |
| | · | · | · | · | · | · | · | · | · | · | · |
| | · | · | · | · | · | · | · | · | · | · | · |
| | · | · | · | · | · | · | · | · | · | · | · |

FIG. 19

SECOND MEASUREMENT DIRECTION Y1 CORRECTION VALUE TABLE (nm)

| | | SECOND MEASUREMENT DIRECTION Y1 ABSOLUTE POSITION (nm) | | | | | | | | | |
|---|---|---|---|---|---|---|---|---|---|---|---|
| | | 1 | 2 | 3 | 4 | 5 | 6 | 7 | · | · | · |
| FIRST MEASUREMENT DIRECTION X1 ABSOLUTE POSITION (nm) | 1 | 0.3 | 0.2 | 0.1 | 0.3 | 0.4 | 0.5 | 0.2 | · | · | · |
| | 2 | 0.1 | 0.1 | 0.2 | 0.4 | 0.1 | 0.4 | 0.1 | · | · | · |
| | 3 | 0.3 | 0.3 | 0.1 | 0.3 | 0.3 | 0.3 | 0.2 | · | · | · |
| | 4 | 0.2 | 0.4 | 0.1 | 0.5 | 0.4 | 0.1 | 0.3 | · | · | · |
| | 5 | 0.1 | 0.5 | 0.2 | 0.4 | 0.3 | 0.2 | 0.4 | · | · | · |
| | 6 | 0.2 | 0.3 | 0.3 | 0.2 | 0.2 | 0.1 | 0.5 | · | · | · |
| | 7 | 0.1 | 0.3 | 0.4 | 0.1 | 0.1 | 0.2 | 0.3 | · | · | · |
| | · | · | · | · | · | · | · | · | · | · | · |
| | · | · | · | · | · | · | · | · | · | · | · |
| | · | · | · | · | · | · | · | · | · | · | · |
| | · | · | · | · | · | · | · | · | · | · | · |
| | · | · | · | · | · | · | · | · | · | · | · |
| | · | · | · | · | · | · | · | · | · | · | · |

DISPLACEMENT DETECTING DEVICE AND SCALE

CROSS REFERENCES TO RELATED APPLICATIONS

The present invention contains subject matter related to Japanese Patent Application JP 2012-268988 and Japanese Patent Application JP 2013-224094 filed in the Japanese Patent Office on Dec. 10, 2012 and Oct. 29, 2013, respectively, the entire contents of which being incorporated herein by reference.

BACKGROUND OF THE INVENTION

Field of the Invention

The present invention relates to a displacement detecting device used when performing positioning and detecting an amount of displacement in the linear direction in a machine tool, an industrial machine, a robot, etc., and to a scale used in the displacement detecting device.

Description of the Related Art

Conventionally, a scale and a displacement detecting device including a detection head are used to detect an amount of linear movement and a linear position for positioning, controlling, position displaying, etc., of a machine tool, an industrial machine, a robot, etc. Further, in recent years, a displacement detecting device is also proposed, which detects an absolute position of a detection head with respect to a scale by detecting an origin mark using a vernier scale, not only an amount of displacement (movement) of the detection head.

As a conventional displacement detecting device of this type, for example, there is one as described in Patent Literature 1. The displacement detecting device described in Patent Literature 1 includes a scale in which a first region in which position information is recorded at predetermined intervals and a second region in which position information is recorded at intervals different from those in the first region are formed. Further, the displacement detecting device described in Patent Literature 1 includes a first reading unit configured to read position information in the first region and a second reading unit configured to read position information in the second region.

Then, in the displacement detecting device described in Patent Literature 1, when a difference between a first phase detected by reading position information in the first region and a second phase detected by reading position information in the second region becomes an arbitrarily set value, an origin signal is generated. By taking the origin signal to be a reference, the absolute position of the detection head with respect to the scale is detected. That is, in the displacement detecting device described in Patent Literature 1, by the phase difference between the first region and the second region, the origin mark is formed arbitrarily.

[Patent Literature 1] Japanese Patent Laid-Open No. 2004-170153

SUMMARY OF THE INVENTION

However, in the conventional displacement detecting device described in Patent Literature 1, the first region is arranged on one side of the measurement direction of the scale and the second region is arranged on the other side of the measurement direction of the scale. Further, in a case where the first reading unit gets away from the first region or in a case where the second reading unit gets away from the second region, it is not possible to form the origin mark, and therefore, a displacement cannot be detected. As a result of that, in the displacement detecting device described in Patent Literature 1, a measurement range is limited to lengths of the first region and the second region in the measurement direction.

Further, it can be thought to extend the measurement range by increasing the intervals in the first region and in the second region, but there is such a problem that detection accuracy reduces considerably when the scale tilts or when the scale expands or shrinks due to a change in temperature, etc.

It can also be thought to arrange the second region in a direction parallel to the measurement surface of the scale and orthogonal to the measurement direction (orthogonal direction) with respect to the first region. However, in this case, there is also such a problem that the measurement range when the first reading unit or the second reading unit moves in the orthogonal direction is limited.

An object of the present invention is to provide a displacement detecting device and a scale capable of achieving improvement in the measurement range without being restricted by the origin mark and the origin signal.

In order to solve the above-mentioned problems and to achieve the object of the present invention, the displacement detecting device of the present invention includes a scale, a first displacement detecting unit, a second displacement detecting unit, a first displacement computing unit, a second displacement computing unit, a comparing unit, and an absolute position computing unit.

The scale has marks whose pitch interval can be approximated to a quadratic or higher-order polynomial along the measurement direction, or changes randomly.

The first displacement detecting unit is arranged facing the scale and detects a displacement in the measurement direction.

The second displacement detecting unit is arranged facing the scale and with a predetermined interval in the measurement direction from the first displacement detecting unit, and detects a displacement in the measurement direction.

The first displacement computing unit outputs first relative position information based on the displacement in the measurement direction detected by the first displacement detecting unit.

The second displacement computing unit outputs second relative position information based on the displacement in the measurement direction detected by the second displacement computing unit.

The comparing unit calculates a difference between the first relative position information and the second relative position information per unit displacement in the position where the first displacement detecting unit is arranged. Further, the comparing unit calculates absolute position information with respect to the measurement direction of the scale based on the calculated difference.

The absolute position computing unit computes the absolute position in the measurement direction with respect to the scale based on the absolute position information from the comparing unit and the relative position information of at least one of the first relative position information and the second relative position information, and outputs the absolute position.

The scale of the present invention has marks whose pitch interval can be approximated to a quadratic or higher-order polynomial along the measurement direction, or changes randomly.

According to the displacement detecting device and the scale of the present invention, it is possible to detect the absolute position in the measurement direction of the scale without using the origin mark and origin signal. Due to this, it is possible to extend the measurable range because there are no restrictions by the origin mark in the measurement direction and in the direction parallel to the measurement surface of the scale and orthogonal to the measurement direction.

BRIEF DESCRIPTION OF THE DRAWINGS

FIG. 16 is a diagram showing an example of a data table stored in a memory of the displacement detecting device in the fifth embodiment example of the present invention.

FIG. 18 is a diagram showing an example of a data table stored in a first memory of the displacement detecting device in the sixth embodiment example of the present invention.

FIG. 19 is a diagram showing an example of a data table stored in a second memory of the displacement detecting device in the sixth embodiment example of the present invention.

FIG. 20A is an enlarged plan view and FIG. 20B is an enlarged section view.

FIG. 21A is an enlarged plan view and FIG. 21B is an enlarged section view.

FIG. 22A is an enlarged plan view and FIG. 22B is an enlarged section view.

FIG. 23A is an enlarged plan view and FIG. 23B is an enlarged section view.

DESCRIPTION OF THE PREFERRED EMBODIMENTS

Hereinafter, displacement detecting devices of embodiment examples of the present invention are explained with reference to FIG. 1 to FIG. 26. In each drawing, the same symbol is attached to the common member. The present invention is not limited to the following embodiments.

1. First Embodiment Example

First, a configuration of a displacement detecting device in a first embodiment example (hereinafter, referred to as the "present example") of the present invention is explained in accordance with FIG. 1 to FIG. 3.

1-1. Configuration Example of Displacement Detecting Device

Figure 1:
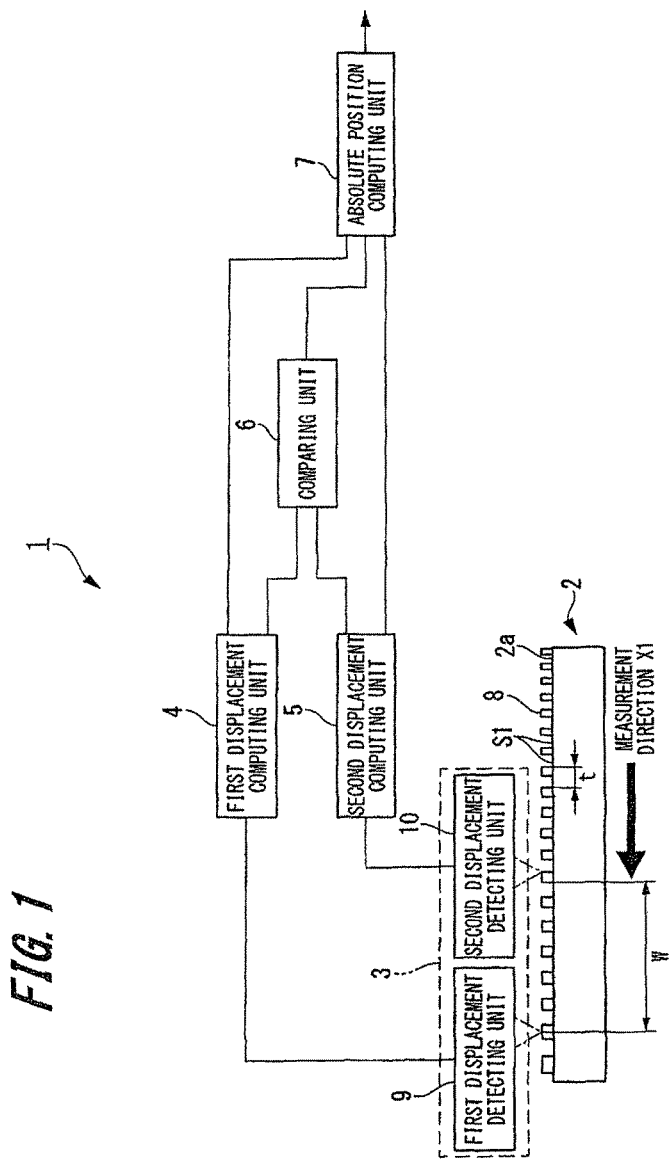
FIG. 1 is an outline configuration diagram showing a configuration of a displacement detecting device in a first embodiment example of the present invention.

FIG. 1 is an outline configuration diagram showing a configuration of a displacement detecting device.

A displacement detecting device 1 of the present example is a displacement detecting device capable of detecting linear displacement and an absolute position with respect to a scale using a reflective diffraction grating. As shown in FIG. 1, the displacement detecting device 1 includes a scale 2, a detection head 3, a first displacement computing unit 4 and a second displacement computing unit 5 connected to the detection head 3, a comparing unit 6, and an absolute position computing unit 7.

[Scale]

The scale 2 is formed into the shape of substantially a flat plate. Over a measurement surface 2a of the scale 2, the detection head 3 is arranged facing the measurement surface 2a. The scale 2 and the detection head 3 move relatively along the measurement surface 2a of the scale 2. In the present example, the detection head 3 moves in a measurement direction X1 of the scale 2 along the measurement surface 2a. It may also be possible to move the scale 2 in the measurement direction X1 along the measurement surface 2a, i.e. it is only required for the detection head 3 and the scale 2 to move relatively in the measurement direction X1 along the measurement surface 2a. On the measurement surface 2a of the scale 2, a plurality of slits S1, which is an example of marks, is formed with an interval t along the measurement direction X1. By the plurality of slits S1, a diffraction grating 8 is configured.

Figure 2:
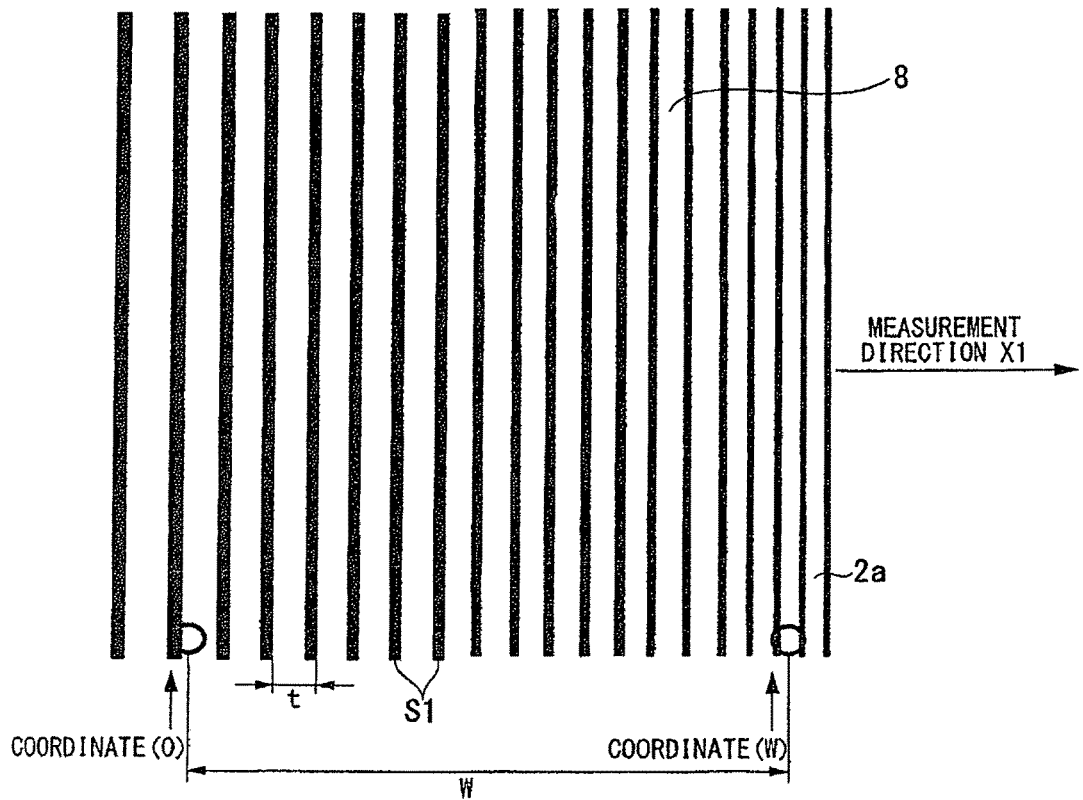
FIG. 2 is an explanatory diagram showing a scale of the displacement detecting device in the first embodiment example of the present invention.

FIG. 2 is a plan view showing the scale.

As shown in FIG. 2, the plurality of slits S1 provided on the measurement surface 2a extends in the direction parallel to the measurement surface 2a and orthogonal to the measurement direction X1. The interval (hereinafter, referred to as the "pitch interval") t between the neighboring slits S1 in the diffraction grating 8 changes continuously along the measurement direction X1. The change in the pitch interval t of the diffraction grating 8 is set so as to be capable of being approximated by a quadratic polynomial with respect to the coordinate in the measurement direction X1 in the scale 2 and for example, the change can be expressed by expression 1 below.

$$f(x)=ax^2+bx+C \quad \text{[Expression 1]}$$

Here, x denotes the coordinate in the measurement direction X1, and a, b, and C denote coefficients in the case where the pitch interval t is approximated to a quadratic polynomial.

For example, in a case where the coordinate in the measurement direction X1 in the scale 2 is (0), the pitch interval t is f(0)=C and in a case where the coordinate in the measurement direction X1 in the scale 2 is (W), the pitch interval t is $f(W)=aW^2+bW+C$.

In the present example, the example is explained in which the change in the pitch interval t of the diffraction grating 8 is expressed by the quadric polynomial with respect to the coordinate in the measurement direction X1, but the example is not limited to this. For example, it may also be possible to set the change in the pitch interval t of the diffraction grating 8 so that the change is approximated to a cubic or higher-order polynomial with respect to the coordinate in the measurement direction X1.

The range of approximation is set in a variety of ways depending on the measurement accuracy required for the displacement detecting device 1. That is, in a case where high accuracy is required for the displacement detecting device 1, it is preferable that the error in the detected absolute position, to be described later, is included within the range of one period of the relative position information detected by the first displacement computing unit 4 or the second displacement computing unit 5.

[Detection Head]

As shown in FIG. 1, the detection head 3 has a first displacement detecting unit 9 and a second displacement detecting unit 10 configured to detect the pitch of the grating of the diffraction grating 8. The second displacement detecting unit 10 is provided on the inline in the measurement direction X1 with the predetermined interval W from the first displacement detecting unit 9. That is, the first displacement detecting unit 9 and the second displacement detecting unit 10 are arranged in such a manner that the line connecting the first displacement detecting unit 9 and the second displacement detecting unit 10 is along (parallel to) the measurement direction X1.

In the present example, the example is explained in which the first displacement detecting unit 9 and the second displacement detecting unit 10 are arranged on the inline in the measurement direction X1, but the example is not limited to this. For example, the first displacement detecting unit 9 and the second displacement detecting unit 10 may be arranged in positions not on the inline in the measurement direction X1, i.e. the line connecting the first displacement detecting unit 9 and the second displacement detecting unit 10 may be inclined with respect to the measurement direction X1. However, when the detection head 3 and the scale 2 move relatively, an Abbe error occurs due to the deviation, such as pitching and yawing, and therefore, it is preferable to arrange the first displacement detecting unit 9 and the second displacement detecting unit 10 on the inline in the measurement direction X1.

In the present example, the example is explained in which the first displacement detecting unit 9 and the second displacement detecting unit 10 are provided within the one detection head 3, but the example is not limited to this. For example, it may also be possible to provide the first displacement detecting unit 9 and the second displacement detecting unit 10 separately in different detection heads and to arrange the two detection heads so as to face the measurement surface of the scale. In this case, the two detection heads are arranged with the predetermined interval W in the first measurement direction X1. At this time, the two detection heads and the scale 2 move relatively along the measurement surface 2a.

The first displacement detecting unit 9 and the second displacement detecting unit 10 have the same configuration, and therefore, the first displacement detecting unit 9 is explained here.

Figure 3:
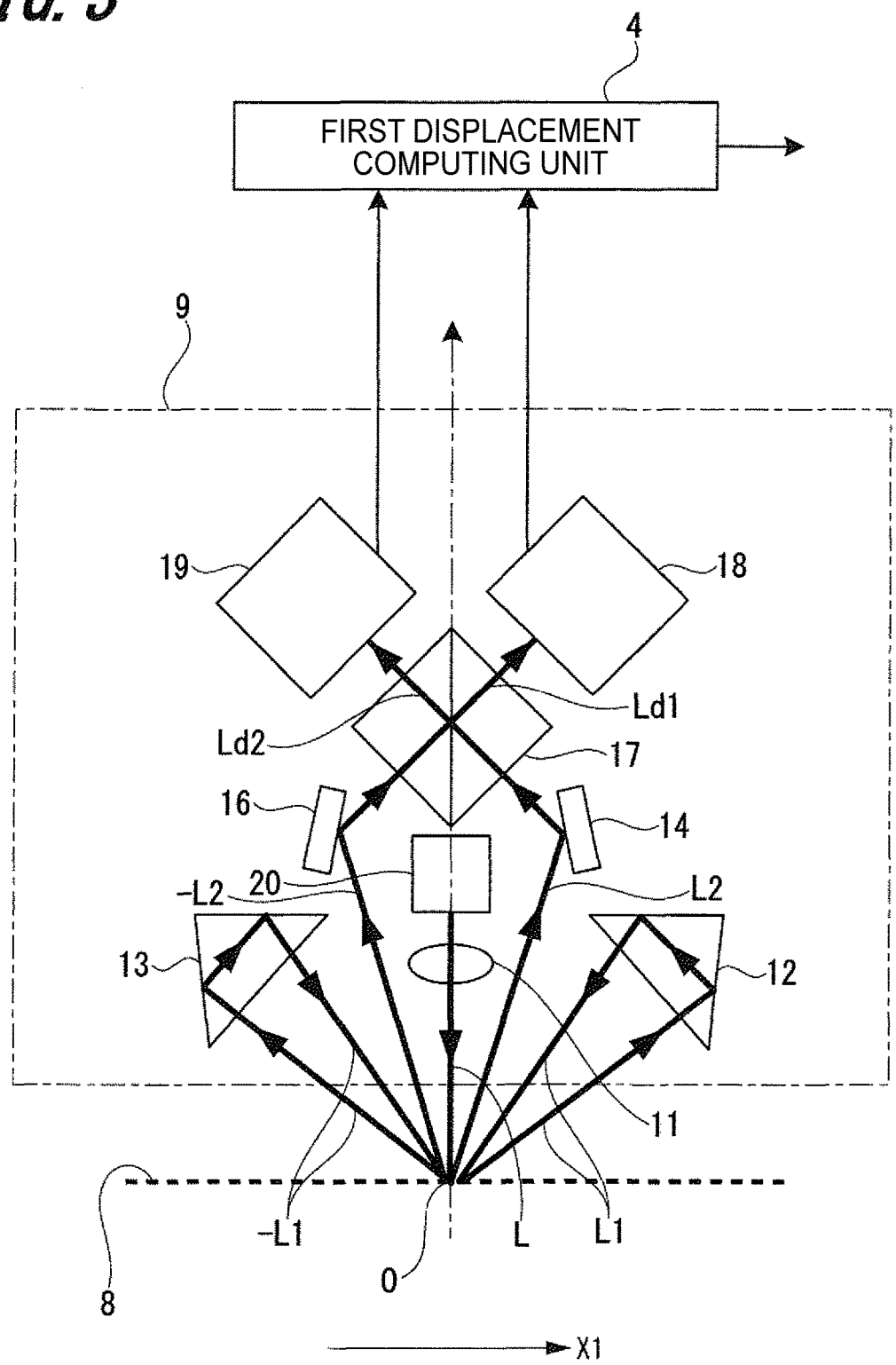
FIG. 3 is an outline configuration diagram showing a configuration of a first displacement detecting unit of the displacement detecting device in the first embodiment example of the present invention.

FIG. 3 is an outline configuration diagram showing a configuration of the first displacement detecting unit 9.

The first displacement detecting unit 9 has a light source 20, a lens 11, a first reflecting unit 12, a second reflecting unit 13, a first mirror 14, a second mirror 16, a beam splitter 17, a first light receiving unit 18, and a second light receiving unit 19.

The light source 20 is arranged substantially vertical to the measurement surface 2a of the scale 2. As the light source 20, a coherent light source is desirable and mention is made of, for example, a gas laser, a semiconductor laser diode, a superluminescence diode, a light emitting diode, etc.

In the present example, the example is explained in which the light source 20 is arranged within the first displacement detecting unit 9, but the example is not limited to this. For example, the light source 20a may have a configuration in which light is supplied from the light source provided outside the first displacement detecting unit 9 through an optical fiber. Further, by modifying the configuration into one in which the light source may be attached and detached, the maintenance of the light source in a position distant from the displacement detecting device 1 is enabled, which improves workability.

Between the light source 20 and the scale 2, the lens 11 is arranged. This lens 11 condenses light L irradiated from the light source 20 so as to have an arbitrary diameter. It may also be possible to use the lens 11 for which achromatic measures have been taken depending on the wavelength range to be used. By taking achromatic measures for the lens 11, it is possible to reduce fluctuations in the focal length due to wavelength fluctuations of the light source 20. As a result of that, it is made possible to perform stabler displacement measurement.

The light L irradiated from the light source 20 is irradiated to an arbitrary spot O of the diffraction grating 8 of the scale 2 via the lens 11. The light L with which the diffraction grating 8 is irradiated undergoes first-time diffraction (reflection) by the diffraction grating 8. Due to this, the light L with which the diffraction grating 8 is irradiated is split, by the diffraction grating 8, into diffracted light L1 having undergone the first-time diffraction having a positive order (hereinafter, referred to as "once diffracted light") and once diffracted light −L1 having a negative order.

The first reflecting unit 12 and the second reflecting unit 13 are arranged along the first measurement direction X1 so as to sandwich the light source 20 in between. The first reflecting unit 12 and the second reflecting unit 13 are configured by, for example, a prism and a plurality of mirrors.

To the first reflecting unit 12, the once diffracted light L1 having a positive order and having undergone the one-time diffraction by the diffraction grating 8 enters, and to the second reflecting unit 13, the once diffracted light −L1 having a negative order and having undergone the one-time diffraction by the diffraction grating 8 enters. The first reflecting unit 12 reflects the incident once diffracted light L1 twice within the first reflecting unit 12 and reflects the light L1 again to the spot O of the diffraction grating 8. The second reflecting unit 13 reflects the incident once diffracted light −L1 twice within the second reflecting unit 13 and reflects the light −L1 again to the spot O of the diffraction grating 8.

In the present example, the example is explained in which the once diffracted lights L1 and −L1 are reflected twice within the first reflecting unit 12 and the second reflecting unit 13, respectively, using a prism as the reflecting units, but the example is not limited to this. For example, it may also be possible to return the incident once diffracted lights L1 and −L1 to the diffraction grating 8 again by reflecting the lights once using one mirror as the first reflecting unit 12 and the second reflecting unit 13.

The once diffracted light L1 having a positive order and having again entered the diffraction grating 8 by the first reflecting unit 12 undergoes the second-time diffraction by the diffraction grating 8 and is emitted from the diffraction grating 8 as diffracted light L2 having undergone the second-time diffraction and having a positive order (hereinafter, referred to as "twice diffracted light"). The once diffracted light −L1 having a negative order and having again entered the diffraction grating 8 by the second reflecting unit 13 undergoes the second-time diffraction by the diffraction grating 8 and is emitted from the diffraction grating 8 as twice diffracted light −L2 having a negative order.

The first mirror 14 and the second mirror 16 are arranged along the measurement direction X1 so as to sandwich the light source 20 in between. To the first mirror 14, the twice diffracted light L2 having a positive order enters, and to the second mirror 16, the twice diffracted light −L2 having a negative order enters. Then, the first mirror 14 reflects the incident twice diffracted light L2 to the beam splitter 17 and the second mirror 16 reflects the incident twice diffracted light −L2 to the beam splitter 17.

At the upper part in the opposite direction of the diffraction grating 8 with respect to the light source 20, the beam splitter 17 is arranged. The beam splitter 17 obtains coherent light by superimposing the two twice diffracted lights L2 and −L2 reflected from the first mirror 14 and the second mirror 16. Further, the beam splitter 17 splits the coherent light into first coherent light Ld1 and second coherent light Ld2 and emits them. Above the emission port of the first coherent light Ld1 in the beam splitter 17, the first light receiving unit 18 is provided and above the emission port of the second coherent light Ld2 in the beam splitter 17, the second light receiving unit 19 is provided.

The first light receiving unit 18 and the second light receiving unit 19 in the first displacement detecting unit 9 are connected to the first displacement computing unit 4. The first light receiving unit 18 and the second light receiving unit 19 in the second displacement detecting unit 10 are connected to the second displacement computing unit 5.

The first light receiving unit 18 obtains an interference signal of A cos (4KΔx+δ) by receiving and photoelectrically converting the coherent light Ld. A denotes the amplitude of interference and K denotes the wave number expressed by 2π/t. Further, Δx denotes the amount of movement of the detection head 3 in the measurement direction X1 and δ denotes the initial phase.

In the first displacement detecting unit 9 of the displacement detecting device 1 in the present example, the light L irradiated from the light source 20 is split into the once diffracted light L1 having a positive order and the once diffracted light −L1 having a negative order by the diffraction grating 8. Further, diffraction is performed twice (2K) by the diffraction grating 8 and the two twice diffracted lights L2 and −L2 are superimposed on each other by the beam splitter 17 (2K+2K=4K). Because of this, the amount of movement of x is multiplied by 4K as in the interference signal described above.

Consequently, by the relative movement of the diffraction grating 8 and the first displacement detecting unit 9 in the measurement direction X1, four waves, i.e. four cycles of brightness and darkness of light per pitch (1t) of the diffraction grating 8 can be obtained by the first light receiving unit 18. Because of this, displacement detection with a high resolution is enabled.

The signal obtained by the second light receiving unit 19 is different in phase by 90 degrees from the interference signal obtained by the first light receiving unit 18. Because of this, it is possible to obtain a sine signal and a cosine signal. Then, the sine signal and the cosine signal are output to the first displacement computing unit 4.

[First Displacement Computing Unit and Second Displacement Computing Unit]

In the first displacement computing unit 4, the signal sent from the first displacement detecting unit 9 is subjected to interpolation as well as digital conversion, and is converted into incremental information. Then, the first displacement computing unit 4 measures by how many periods described above the coherent light intensity has changed by counting the number of pulses of the incremental information by a counter, not shown schematically. Due to this, the first displacement computing unit 4 outputs first relative position information in the measurement direction X1 in the first displacement detecting unit 9.

The second displacement computing unit 5 receives photoelectrically converted signals from the first light receiving unit 18 and the second light receiving unit 19 of the second displacement detecting unit 10 and outputs second relative position information in the measurement direction X1 in the second displacement detecting unit 10 as in the first displacement computing unit 4.

[Comparing Unit]

The first displacement computing unit 4 and the second displacement computing unit 5 are connected to the comparing unit 6 and the absolute position computing unit 7. To the comparing unit 6, the first relative position information is output from the first displacement computing unit 4 and the second relative position information is output from the second displacement computing unit 5. The comparing unit 6 calculates absolute position information based on the first relative position information and the second relative position information. Detailed explanation of the calculation method of absolute position information will be given later. To the comparing unit 6, the absolute position computing unit 7 is connected. Then, the comparing unit 6 outputs the calculated absolute position information to the absolute position computing unit 7.

[Absolute Position Computing Unit]

To the absolute position computing unit 7, the relative position information is output from at least one of the first displacement computing unit 4 and the second displacement computing unit 5 and also, the absolute position information is output from the comparing unit 6. Then, the absolute position computing unit 7 calculates the absolute position of the detection head 3 with respect to the scale 2 based on the relative position information and the absolute position information output from the comparing unit 6 and outputs the absolute position.

[Manufacturing Method of Diffraction Grating]

Figure 4:
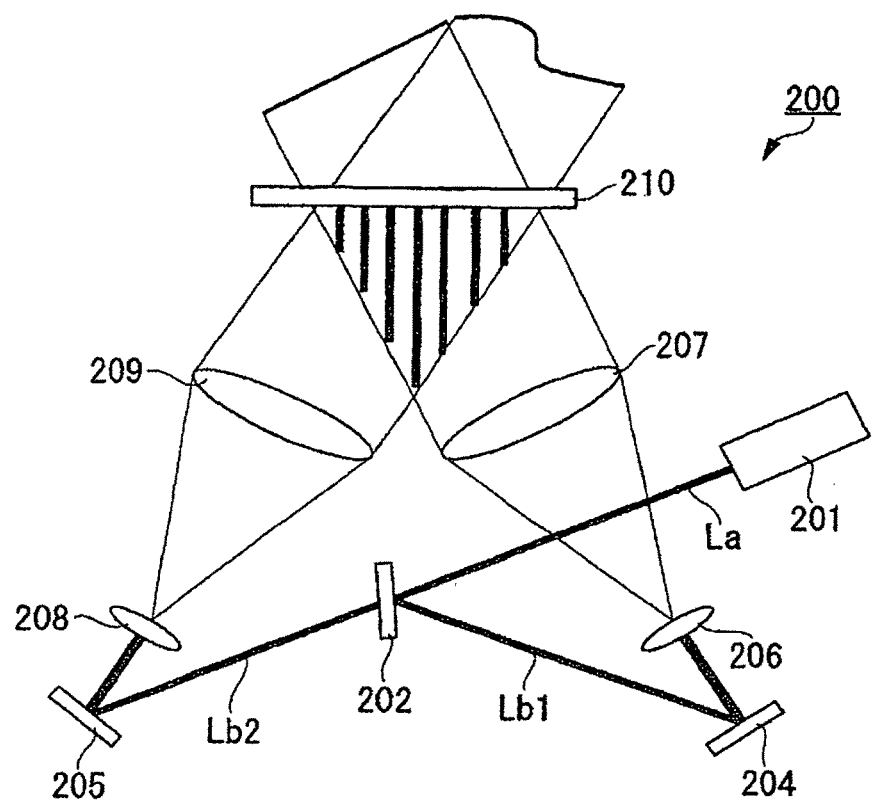
FIG. 4 is an explanatory diagram for explaining a manufacturing method of the scale of the displacement detecting device in the first embodiment example of the present invention.

Next, with reference to FIG. 4, a manufacturing method of the diffraction grating 8 is explained.

The diffraction grating 8 of the present example is manufactured by using, for example, an exposure device 200 shown in FIG. 4. The exposure device 200 is a device that forms an interference pattern by exposing it to light on the surface of a material with photosensitivity (hereinafter, referred to as a "photosensitive material") by the interference exposure system using two luminous fluxes. Then, the interference pattern formed by being exposed to light on the surface of a photosensitive material 210 serves as the diffraction grating 8.

As shown in FIG. 4, the exposure device 200 includes a light source 201, which is a coherent light source, a distributor 202, a first mirror 204, a second mirror 205, a first lens 206, a second lens 207, a third lens 208, and a fourth lens 209.

As the light source 201, which is a coherent light source, mention is made of, for example, a laser diode, a superluminescence diode, a gas laser, a solid-state laser, a light emitting diode, etc.

A luminous flux La emitted from the light source 201 is split into a first luminous flux Lb1 and a second luminous flux Lb2 by the distributor 202. The first luminous flux Lb1 enters the first mirror 204 and the second luminous flux Lb2 enters the second mirror 205.

Between the first mirror 204 and the scale 2, the first lens 206 and the second lens 207 are arranged. Between the second mirror 205 and the scale 2, the third lens 208 and the fourth lens 209 are arranged.

The first luminous flux Lb1 having entered the first mirror 204 is reflected by the first mirror 204 and enters the surface of the photosensitive material 210 via the first lens 206 and the second lens 207. The second luminous flux Lb2 having entered the second mirror 205 is reflected by the second mirror 205 and enters the surface of the photosensitive material 210 via the third lens 208 and the fourth lens 209.

The first luminous flux Lb1 is converted into a plane wave whose wave surface is flat by the first lens 206 and the second lens 207 and enters the photosensitive material 210. The second luminous flux Lb2 is converted into a plane wave whose wave surface has a predetermined aberration with respect to the wave surface of the first luminous flux Lb1 by the third lens 208 and the fourth lens 209 and enters the photosensitive material 210. The first luminous flux Lb1 and the second luminous flux Lb2 are superimposed on each other and an interference fringe pattern having a desired period is formed on the surface of the photosensitive material 210. Then, the surface of the photosensitive material 210 is exposed to light along the interference fringe pattern, and thereby the diffraction grating 8 is formed.

For the exposure device 200 shown in FIG. 4, the example is explained in which the wave surface of the plane wave of the second luminous flux Lb2 has an aberration, but the example is not limited to this and both the wave surface of the plane wave of the first luminous flux Lb1 and the wave surface of the plane wave of the second luminous flux Lb2 may have a predetermined aberration.

The method for forming the diffraction grating 8 is not limited to the above-described method that uses the exposure device 200 and for example, it may also be possible to form the slit S1 one by one on the surface of the photosensitive material 210 by narrowing the laser beam or to use other various kinds of methods.

[Relationship Between Pitch Interval and Output Value of Comparing Unit]

Figure 5:
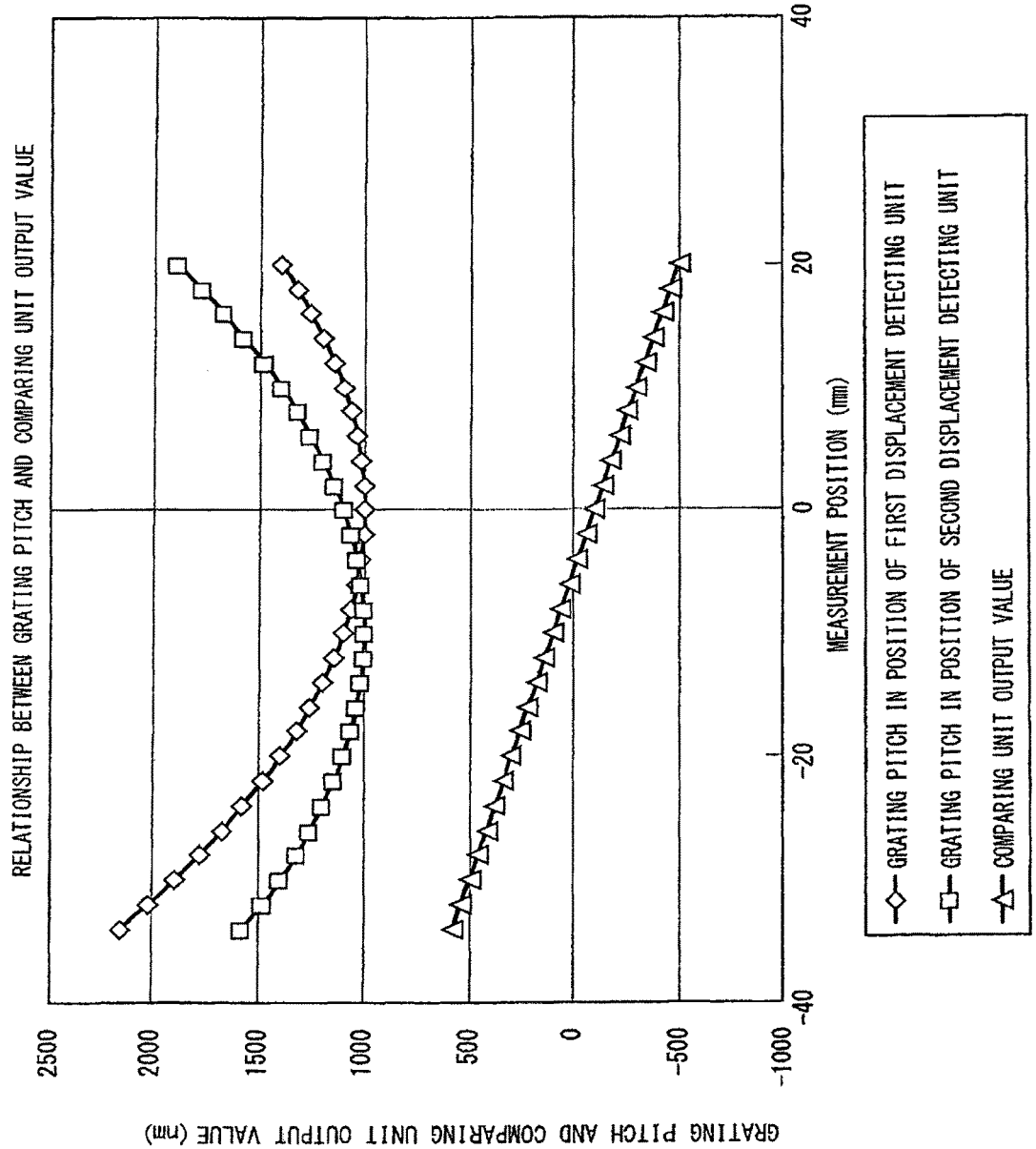
FIG. 5 is a graph showing a relationship between the pitch interval and an output value of a comparing unit, and the measurement position of the displacement detecting device in the first embodiment example of the present invention.

Next, with reference to FIG. 1, FIG. 2, and FIG. 5, the relationship between the pitch interval t and the output value of the comparing unit is explained. FIG. 5 is a graph showing the relationship between: the pitch interval and the output value of the comparing unit; and the measurement position.

As shown in FIG. 1, the second displacement detecting unit 10 is arranged in the detection head 3 with the predetermined interval W along the measurement direction X1 from the first displacement detecting unit 9. Because of this, when the first displacement detecting unit 9 is located at the coordinate (0) in the measurement direction X1 on the measurement surface $2a$ as shown in FIG. 2, the second displacement detecting unit 10 is arranged at the coordinate (W) in the measurement direction X1 on the measurement surface $2a$. When the first displacement detecting unit 9 is located at the coordinate (x) in the measurement direction X1 on the measurement surface $2a$, the second displacement detecting unit 10 is arranged at a coordinate (x+W) in the measurement direction X1 on the measurement surface $2a$.

As described above, the change in the pitch interval t of the diffraction grating 8 is expressed by the expression 1. Because of this, if attention is focused on the first displacement detecting unit 9, it is possible to express the pitch interval t detected by the second displacement detecting unit 10 by expression 2 below.

$$f(x+W)=a(x+W)^2+b(x+W)+C \quad \text{[Expression 2]}$$

Further, the comparing unit 6 compares the first relative position information from the first displacement computing unit 4 and the second relative position information from the second displacement computing unit 5. In the present example, the comparing unit 6 computes a difference between the first relative position information of the first displacement computing unit 4 and the second relative position information of the second displacement computing unit 5 per unit displacement (x) in the first displacement detecting unit 9. That is, the comparing unit 6 computes a difference between the pitch interval t in the position of the first displacement detecting unit 9 and the pitch interval t in the position of the second displacement detecting unit 10. This difference (output value of the comparing unit 6) can be expressed by expression 3 below.

$$f(x)-f(x+W)=-2aWx-(aW^2-bW)$$ [Expression 3]

As shown in FIG. 5 and by the expression 3, the difference in the pitch interval t, which is the output value of the comparing unit 6, is expressed by the linear expression in which the difference is in proportion to the coordinate (measurement position) x in the measurement direction X1. Further, in the comparing unit 6, information indicative of the relationship between the difference in the pitch interval t and the measurement position of the scale 2 is stored in advance. Then, the comparing unit 6 outputs absolute position information indicative of the absolute position of the scale 2 from the computed pitch interval t and the graph shown in FIG. 5 stored in advance indicative of the relationship between the output value and the measurement position, or from the expression 3.

The larger the change in the pitch interval t along the measurement direction X1 and the larger the interval W between the first displacement detecting unit 9 and the second displacement detecting unit 10, the larger the slope of the change in the output value in the comparing unit 6 shown in FIG. 5 is. Because of this, it is possible to increase the sensitivity of the absolute position information output by the comparing unit 6.

In the case where the change in the pitch interval t along the measurement direction X1 is small, or in the case where the interval W between the first displacement detecting unit 9 and the second displacement detecting unit 10 is small, the sensitivity of the absolute position information reduces. In this case, it is possible to increase the sensitivity of the absolute position information by increasing the amount of displacement per unit displacement amount of the first displacement detecting unit 9 used when computing the output value (difference) of the comparing unit 6.

In the case where the change in the pitch interval t is approximated to a cubic or higher-order polynomial, the output value (difference in the pitch interval t) of the comparing unit 6 is expressed by a quadratic or higher-order expression. The case where the change in the pitch interval t is approximated to the quadratic or higher-order polynomial is explained, but the case is not limited to this. For example, the change in the pitch interval t may be random as long as it is possible to uniquely find information indicative of the relationship between the difference in the pitch interval t and the measurement position of the scale 2.

1-2. Detection Operation of Absolute Position

Next, the detection operation of the absolute position using the displacement detecting device in the present example is explained with reference to FIG. 1, FIG. 2, FIG. 3, FIG. 5, and FIG. 6.

First, as shown in FIG. 1, the detection head 3 and the scale 2 are moved relatively along the measurement direction X1. As shown in FIG. 3, when the detection head 3 or the scale 2 moves along the measurement direction X1, the first displacement detecting unit 9 and the second displacement detecting unit 10 obtain four cycles of brightness and darkness of light by the first light receiving unit 18 and the second light receiving unit 19 in the amount of displacement per pitch of the diffraction grating 8. Then, the first displacement detecting unit 9 photoelectrically converts the obtained brightness and darkness of light and outputs the resultant signal as a Lissajous signal including a sine signal and a cosine signal to the first displacement computing unit 4. The second displacement detecting unit 10 outputs the acquired Lissajous signal to the second displacement computing unit 5.

Next, the first displacement computing unit 4 computes the first relative position information based on the signal sent from the first displacement detecting unit 9. The second displacement computing unit 5 computes the second relative position information based on the signal sent from the second displacement detecting unit 10. Then, the first displacement computing unit 4 outputs the first relative position information to the comparing unit 6 and the absolute position computing unit 7. The second displacement computing unit 5 outputs the second relative position information to the comparing unit 6 and the absolute position computing unit 7.

Next, the comparing unit 6 computes the absolute position information based on the first relative position information and the second relative position information and outputs the computed absolute position information to the absolute position computing unit 7. Specifically, as described above, the comparing unit 6 computes the difference between the first relative position information of the first displacement computing unit 4 and the second relative position information of the second displacement computing unit 5 when the first displacement detecting unit 9 moves the unit displacement. Then, the comparing unit 6 computes the absolute position information indicative of the absolute position of the scale 2 from the computed difference and information indicative of the relationship between the difference in the pitch interval t and the measurement position of the scale 2 stored in advance and outputs the absolute position information to the absolute position computing unit 7.

Next, the absolute position computing unit 7 compares the relative position information including the incremental information of at least one of the first relative position information and the second relative position information, and the absolute position information output from the comparing unit 6 and outputs the absolute position.

Figure 6:
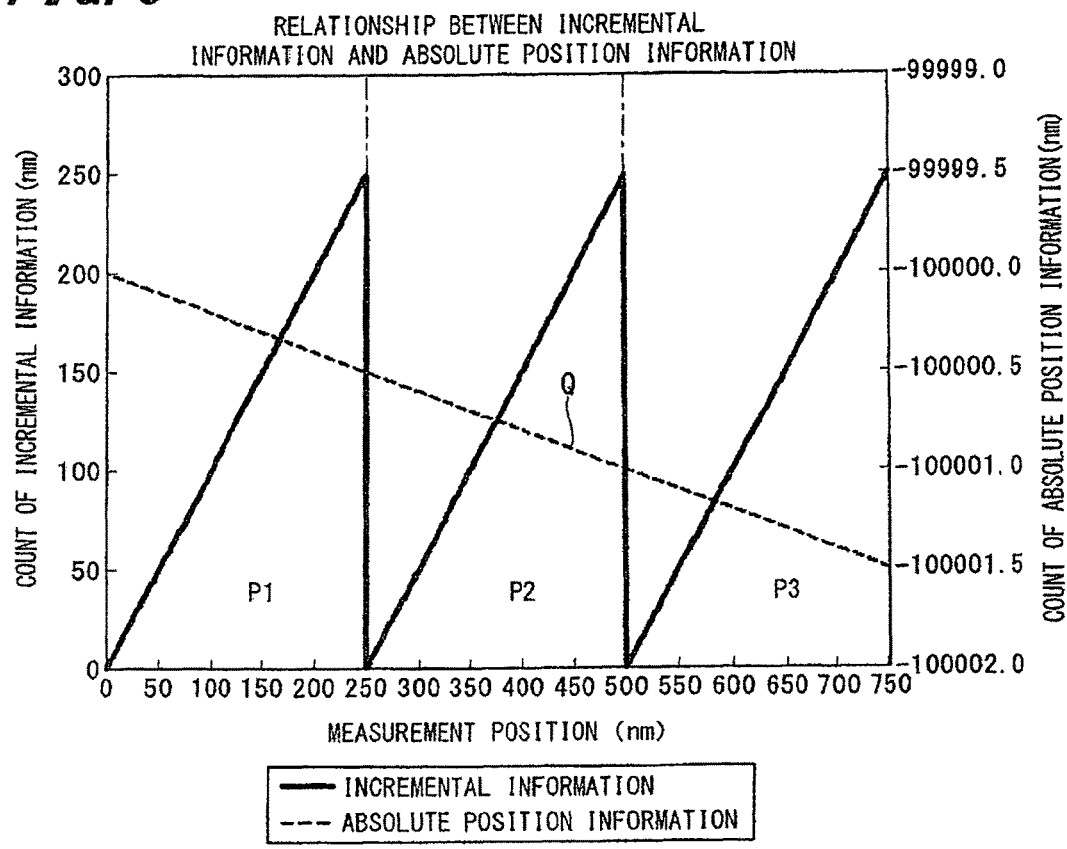
FIG. 6 is a graph showing a relationship between incremental information and absolute position information of the displacement detecting device in the first embodiment example of the present invention.

Here, with reference to FIG. 6, the relationship between the incremental information and the absolute position information is explained. FIG. 6 is a graph showing the relationship between the incremental information and the absolute position information. The graph shown in FIG. 6 shows the relationship between the incremental information and the absolute position information in the case where the first displacement detecting unit 9 and the second displacement detecting unit 10 are arranged 100 mm separated from each other along the measurement direction X1, and the diffraction grating 8 having the change in the pitch interval t that can be approximated to a quadratic polynomial along the measurement direction X1 is used. As the coefficients of the expression 1 expressing the change in the pitch interval t of the diffraction grating 8, a=0.00001, b=0, and C=0.001 are supposed.

As shown in FIG. 6, the period of the interference signal of light becomes ¼ of the pitch interval t, and therefore, one period of the incremental information is about 250 nm. Here, the first displacement computing unit 4 and the second displacement computing unit 5 A/D-convert the periodic signal, for example, divide the periodic signal by the division number of 2,500, and compute with a resolution of 0.1 nm. Because of this, it is concluded that the first displacement computing unit 4 and the second displacement computing unit 5 in the present example have information of the absolute position with a resolution of 0.1 nm within one period of the incremental information, i.e. within 250 nm. Then, the first displacement computing unit 4 and the second displacement computing unit 5 compute the relative position information by continuously adding the information.

However, in the case where the power source is turned off, where foreign matter sticks to the diffraction grating 8, etc., there is such a problem that if the addition of the signals is interrupted, the original position is no longer known. In contrast to this, in the present example, the comparing unit 6 calculates the difference between the first relative position information of the first displacement computing unit 4 and the second relative position information of the second displacement computing unit 5 per unit displacement of the first displacement detecting unit 9 with a resolution of 0.1 nm and takes the difference to be the absolute position information.

Next, it is possible for the absolute position computing unit 7 to allocate addresses, for example, an address 1 of P1, an address 2 of P2, an address 3 of P3, etc., for each period of the incremental information based on the absolute position information computed by the comparing unit 6. Then, the absolute position computing unit 7 determines which address of the incremental information the current position has based on the absolute position information output from the comparing unit 6. For example, as shown in FIG. 6, in the case where the absolute position information from the comparing unit 6 is Q, it is known that the current position is within one period of the address 2 of P2 of the incremental information.

As described above, the pitch interval t of the diffraction grating 8 changes continuously along the measurement direction X1. Because of this, the length corresponding to one period of the incremental information also changes. However, the position in the measurement direction X1 with respect to the diffraction grating 8 is known by the absolute position information from the comparing unit 6, and therefore, the amount of change in the pitch interval t is also known. Because of this, the absolute position computing unit 7 corrects the length corresponding to one period of the incremental information in accordance with the amount of change in the pitch interval t. Then, the absolute position is output from the absolute position computing unit 7 and the detection operation of the absolute position by the displacement detecting device 1 is completed.

It may also be possible for the absolute position computing unit 7 to take the absolute position information calculated by the comparing unit 6 to be displacement information of the higher-order digit of the absolute position to be output and to take the incremental information of the first relative position information or the second relative position information to be displacement information of the lower-order digit of the absolute position to be output. Here, as the higher-order digit, for example, at least the most significant digit is taken.

According to the displacement detecting device 1 of the present example, it is possible to detect the absolute position with respect to the scale 2 without using the origin mark or the origin signal. Due to this, it is possible to easily extend the measurable range in the measurement direction X1 and in the direction parallel to the measurement surface 2a of the scale 2 and orthogonal to the measurement direction X1.

Further, according to the displacement detecting device 1 of the present example, even if foreign matter sticks to the diffraction grating 8 and the first displacement detecting unit 9 or the second displacement detecting unit 10 temporarily loses the detection signal, it is possible to detect an accurate absolute position without producing a detection error by computing the absolute position information by the comparing unit 6.

For the displacement detecting device 1 of the present example, the example is explained in which the absolute position is detected by always using the absolute position information computed by the comparing unit 6, but the example is not limited to this. For example, it may also be possible to compute the absolute position information by the comparing unit 6 only when the power source is turned on and to detect the absolute position by the absolute position computing unit 7. Further, it may also be possible to output the absolute position information from the comparing unit 6 to the absolute position computing unit 7 when the absolute position information computed by the comparing unit 6 reaches a specified value then to correct the absolute position. As the specified value, mention is made of the amount of count (length of the absolute position) of the absolute position information corresponding to one period of the incremental information.

Further, for the displacement detecting device 1 of the present example, the example is explained in which the quadratic polynomial (expression 1) expressing the change in the pitch interval t is known in advance, but the example is not limited to this. For example, in the case where the coefficient C shown in the expression 1 and the interval W between the first displacement detecting unit 9 and the second displacement detecting unit 10 are known in advance, it may also be possible to calculate backward an approximate expression of the quadratic polynomial expressing the change in the pitch interval t from the absolute position information obtained from the comparing unit 6.

In this case, it may happen that the measurement surface 2a provided with the diffraction grating 8 deforms when the scale is attached to a part to be detected of, such as a machine tool and an industrial robot, and the quadratic polynomial (approximate expression) expressing the change in the pitch interval t changes. At this time, it is possible to find an approximate expression of the quadratic polynomial on the displacement detecting device 1 attached to the part to be detected. Due to this, it is possible to make correction even for a slight change on the actual tool, and therefore, it is possible to perform displacement detection with higher accuracy.

Further, for the displacement detecting device 1 of the present example, the example is explained in which as the relative position information to be output to the absolute position computing unit 7, either of the first relative position information computed by the first displacement computing unit 4 and the second relative position information computed by the second displacement computing unit 5 is used, but the example is not limited to this.

For example, there is provided an average value computing unit configured to find an average value of the first relative position information computed by the first displacement computing unit 4 and the second relative position information computed by the second displacement computing unit 5. The average value computing unit outputs the calculated average value to the absolute position computing unit 7. That is, the average value computing unit takes the center position between the first displacement detecting unit 9 and the second displacement detecting unit 10 to be a virtual point and outputs the relative position information of the virtual point as the incremental information to the absolute position computing unit 7. Then, the absolute position computing unit 7 outputs the absolute position based on the incremental information of the average value of the first relative position information and the second relative position information, and the absolute position information from the comparing unit 6.

In this case, it is possible to alleviate deterioration in measurement accuracy in a short section produced by the surface dependence of a substrate in which the slit S1 is formed in the diffraction grating 8 and minute pitch unevenness of the diffraction grating 8 produced at the time of grating formation. Further, it is also possible to alleviate an error between the change in the actual pitch interval t and the expression 1, which is the approximate expression expressing the change in the pitch interval t. Furthermore, even if foreign matter sticks to the diffraction grating 8 and the first relative position information computed by the first displacement computing unit 4 or the second relative position information computed by the second displacement computing unit 5 deviates temporarily from the approximate expression expressing the change in the pitch interval t, it is possible to alleviate the error by calculating the average value of the two pieces of information.

Figure 11:
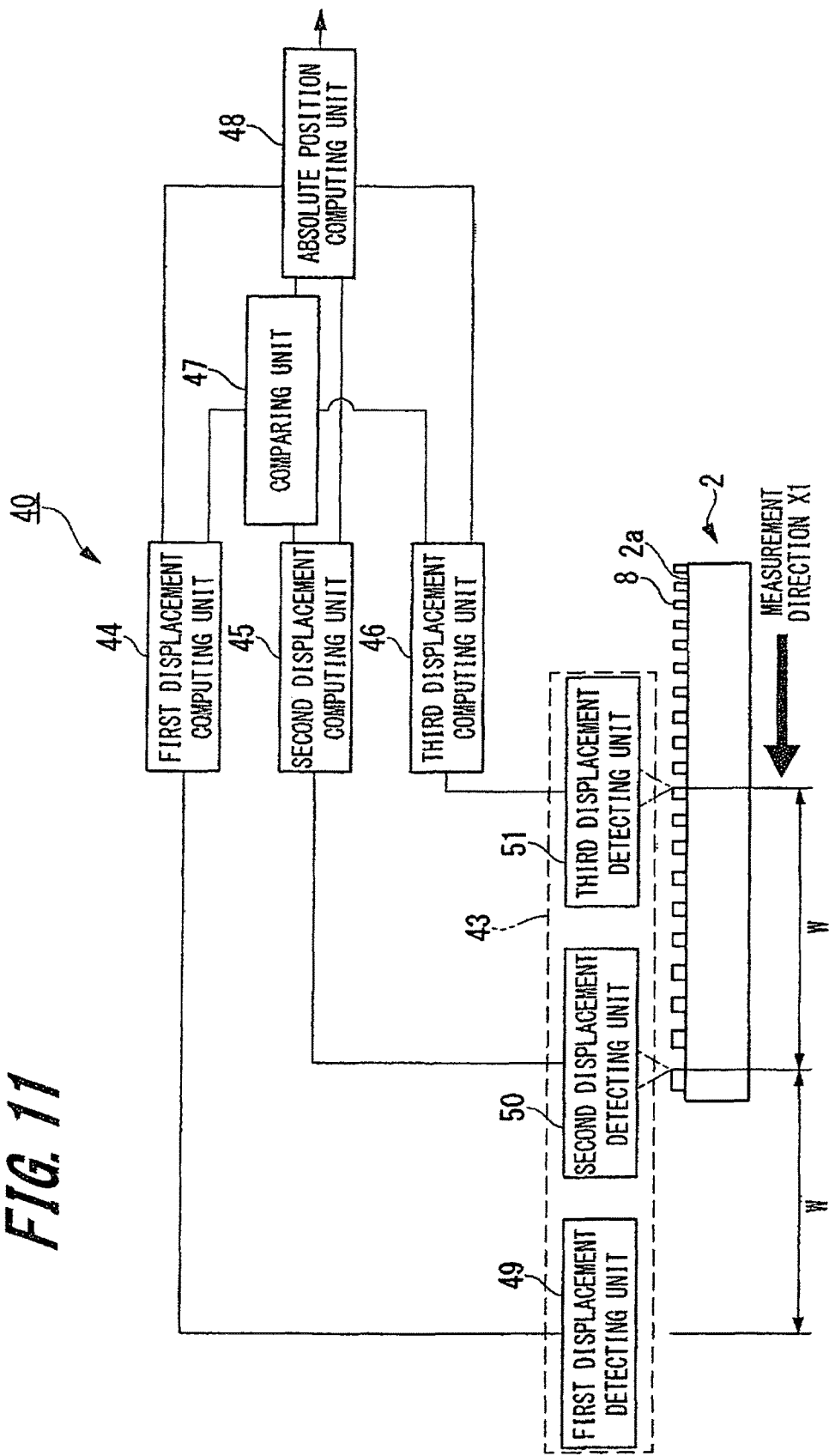
FIG. 11 is an outline configuration diagram showing a configuration of a displacement detecting device in a second embodiment example of the present invention.

In the case where an average value is calculated, the number of displacement detecting units provided in the displacement detecting device 1 is not limited to two and it may also be possible to provide three or more displacement detecting units as shown in FIG. 11, to be described later, and to calculate an average value of the relative position information of these displacement detecting units.

1-3. First Modification of Displacement Detecting Unit

Figure 7:
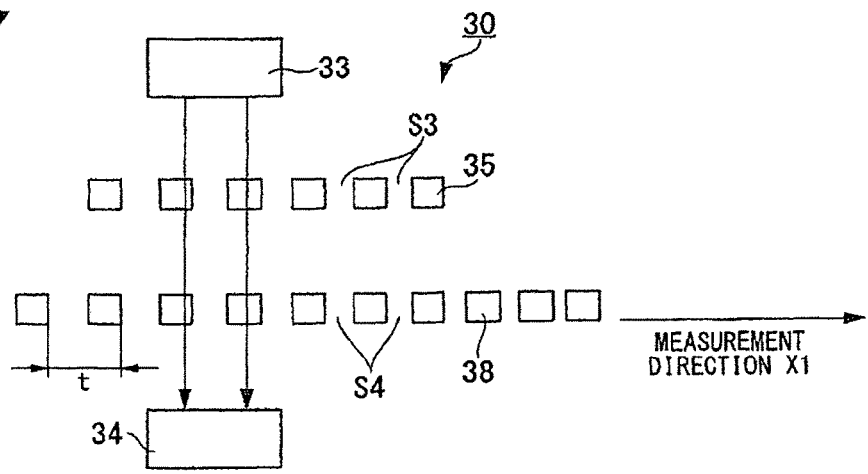
FIG. 7 is an outline configuration diagram showing a first modification of a first displacement detecting unit and a second displacement detecting unit of the displacement detecting device in the first embodiment example of the present invention.

Next, with reference to FIG. 7, a first modification of the displacement detecting unit is explained.

FIG. 7 is an outline configuration diagram showing the first modification of the displacement detecting unit.

For the displacement detecting device 1 according to the first embodiment example described above, the example is explained in which the displacement detecting unit that utilizes diffraction of the diffraction grating 8 as shown in FIG. 3 is used as the displacement detecting unit, but the example is not limited to this. For example, it may also be possible to apply a moire displacement detecting unit 30 shown in FIG. 7 or to apply other kinds of displacement detecting units.

The displacement detecting unit 30 shown in FIG. 7 has a light source 33 provided in a detection head, not shown schematically, a light receiving unit 34 configured to receive light irradiated from the light source 33, a primary scale 35 interposed between the light source 33 and the light receiving unit 34, and a vernier 38.

The primary scale 35 is attached to the detection head, not shown schematically, together with the light source 33. The primary scale 35 is provided with a plurality of slits S3 formed at fixed pitch intervals. The plurality of slits S3 extends in the direction parallel to one surface of the primary scale 35 irradiated by the light source 33 and orthogonal to the measurement direction X1. The light irradiated from the light source 33 passes through the plurality of slits S3 and enters the vernier 38.

The vernier 38 is arranged on the side nearer to the light receiving unit 34 than the primary scale 35. The vernier 38 is provided with a plurality of slits S4. The slits S4 extend in the direction parallel to one surface of the primary scale 35 irradiated by the light source 33 and orthogonal to the measurement direction X1. The interval t of the slits S4 in the vernier 38 changes continuously along the measurement direction X1 as that of the diffraction grating 8 of the first embodiment example. The change in the interval t is set so that the coordinate in the measurement direction X1 in the vernier 38 is expressed by a quadratic or higher-order polynomial, or is set randomly. The light irradiated from the light source 33 and having passed through the primary scale 35 passes through the plurality of slits S4 and enters the light receiving unit 34.

The primary scale 35 and the vernier 38 are supported so as to be capable of moving relatively along the measurement direction X1 by a support member(s), not shown schematically.

To the light receiving unit 34, the light irradiated from the light source 33 and having passed through the primary scale 35 and the vernier 38 enters. Then, the light receiving unit 34 detects the pitch of the vernier 38 by receiving the interference fringe formed when the light passes through the primary scale 35 and the vernier 38.

By using the displacement detecting unit 30 according to the first modification, it is also possible to obtain the same working and effect as those of the displacement detecting device 1 according to the first embodiment example described above.

1-4. Second Modification of Displacement Detecting Unit

Figure 8:
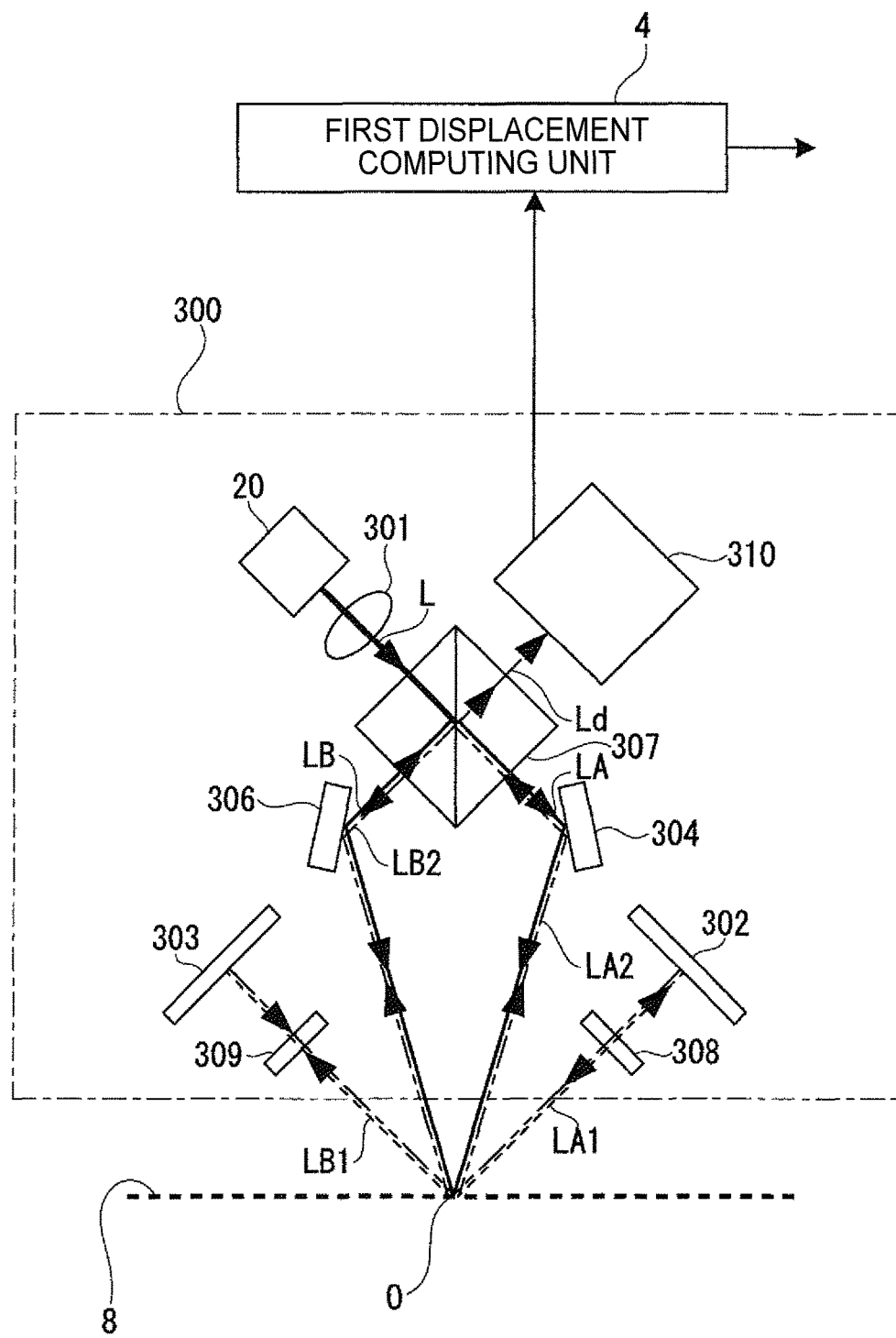
FIG. 8 is an outline configuration diagram showing a second modification of a first displacement detecting unit and a second displacement detecting unit of the displacement detecting device in the first embodiment example of the present invention.

Next, with reference to FIG. 8, a second modification of the displacement detecting unit is explained.

FIG. 8 is an outline configuration diagram showing the second modification of the displacement detecting unit.

For the displacement detecting units 9 and 10 of the displacement detecting device 1 according to the first embodiment example described above, the example is explained in which the light L emitted from the light source 20 is split into the once diffracted light L1 having a positive order and the once diffracted light −L1 having a negative order by the diffraction grating 8, but the example is not limited to this. For example, it may also be possible to apply a displacement detecting unit 300 in which the light L emitted from the light source 20 is split into two lights LA and LB by a beam splitter as shown in FIG. 8. The same symbols are attached to the parts common to those of the displacement detecting units 9 and 10 of the displacement detecting device 1 according to the first embodiment example and duplicated explanation is omitted.

The displacement detecting unit 300 shown in FIG. 8 has the light source 20, a lens 301, a first reflecting unit 302, a second reflecting unit 303, a first mirror 304, a second mirror 306, a beam splitter 307, a first wavelength plate 308, a second wavelength plate 309, and a light receiving unit 310.

The light L emitted from the light source 20 enters the lens 301. The lens 301 condenses the incident light L so as to have an arbitrary diameter. The lens 301 has the same configuration as that of the lens 11 of the displacement detecting units 9 and 10 shown in FIG. 3. On the emission side of the lens 301, the beam splitter 307 is arranged. The light L condensed by the lens 301 enters the beam splitter 307.

The beam splitter 307 splits the light L into the first light LA and the second light LB. The first mirror 304 is arranged on the side of the beam splitter 307 from which the first light LA is emitted, and the second mirror 306 is arranged on the side of the beam splitter 307 from which the second light LB is emitted. Then, the first mirror 304 reflects the first light LA emitted from the beam splitter 307 toward the spot O of the diffraction grating 8. The second mirror 306 reflects the second light LB emitted from the beam splitter 307 toward the spot O of the diffraction grating 8.

The first light LA and the second light LB with which the diffraction grating 8 is irradiated are diffracted (reflected) for the first time by the diffraction grating 8. Due to this, the first light. LA with which the diffraction grating 8 is irradiated is diffracted for the first time by the diffraction grating 8 and turned into first once diffracted light LA1. The second light LB with which the diffraction grating 8 is irradiated is diffracted for the first time by the diffraction grating 8 and turned into second once diffracted light LB1.

The first reflecting unit 302 and the second reflecting unit 303 are arranged so as to sandwich the beam splitter 307 in between. Between the first reflecting unit 302 and the diffraction grating 8, the first wavelength plate 308 is arranged and between the second reflecting unit 303 and the diffraction grating 8, the second wavelength plate 309 is arranged. The first wavelength plate 308 and the second wavelength plate 309 each include a ¼ wavelength plate.

The first once diffracted light LA1 reflected and diffracted by the diffraction grating 8 passes through the first wavelength plate 308 and enters the first reflecting unit 302. The first reflecting unit 302 reflects the incident first once diffracted light LA1 toward the spot O of the diffraction grating 8 again. At this time, the light path through which the first once diffracted light LA1 enters the first reflecting unit 302 from the diffraction grating 8 and the light path through which the light LA1 is reflected from the first reflecting unit 302 to the diffraction grating 8 overlap each other.

The second once diffracted light LB1 reflected and diffracted by the diffraction grating 8 passes through the second wavelength plate 309 and enters the second reflecting unit 303. The second reflecting unit 303 reflects the incident second once diffracted light LB1 toward the spot O of the diffraction grating 8 again. At this time, the light path through which the second once diffracted light LB1 enters the second reflecting unit 303 from the diffraction grating 8 and the light path through which the light LB1 is reflected from the second reflecting unit 303 to the diffraction grating 8 overlap each other.

It may also be possible to provide a lens on the light path between the first reflecting unit 302 and the diffraction grating 8 and on the light path between the second reflecting unit 303 and the diffraction grating 8.

In the displacement detecting unit 300 according to the second modification, it may also be possible to set the light path entering from the diffraction grating 8 to the first reflecting unit 302 or to the second reflecting unit 303 and the light path reflecting from the first reflecting unit 302 or from the second reflecting unit 303 to the diffraction grating 8 so that they do not overlap each other as in the displacement detecting units 9 and 10 shown in FIG. 3 described above. That is, it may also be possible to configure each of the first reflecting unit 302 and the second reflecting unit 303 by, for example, a prism and a plurality of mirrors and to reflect the first once diffracted light LA1 and the second once diffracted light LB1 a plurality of times by the first reflecting unit 302 and the second reflecting unit 303.

The first once diffracted light LA1 having entered the diffraction grating 8 again by the first reflecting unit 302 is diffracted for the second time by the diffraction grating 8 and emitted from the diffraction grating 8 as a first twice diffracted light LA2. The second once diffracted light LB1 having entered the diffraction grating 8 again by the second reflecting unit 303 is diffracted for the second time by the diffraction grating 8 and emitted from the diffraction grating 8 as a second twice diffracted light LB2.

The first twice diffracted light LA2 is reflected by the first mirror 304 and enters the beam splitter 307. The second twice diffracted light LB2 is reflected by the second mirror 306 and enters the beam splitter 307. The beam splitter 307 obtains a coherent light Ld by superimposing the first twice diffracted light LA2 and the second twice diffracted light LB2. The coherent light Ld is emitted from the beam splitter 307 and enters the light receiving unit 310. The light receiving unit 310 is connected to the first displacement computing unit 4 or the second displacement computing unit 5.

The configuration of the light receiving unit 310 is the same as that of the first light receiving unit 18 and the second light receiving unit 19 of the displacement detecting units 9 and 10 shown in FIG. 3, and therefore, explanation thereof is omitted here. Other configurations are the same as those of the displacement detecting units 9 and 10 shown in FIG. 3, and therefore, explanation thereof is omitted. By the displacement detecting unit 300 having the configuration as above, it is also possible to obtain the same working and effect of those of the displacement detecting units 9 and 10 shown in FIG. 3 described above.

As described above, as the displacement detecting unit in the displacement detecting device of the present invention, it is possible to apply various displacement detecting units, such as the displacement detecting unit 30 according to the first modification and the displacement detecting unit 300 according to the second modification.

1-5. Modification of Light Source

Next, a modification of the light source and its periphery is explained with reference to FIG. 9 and FIG. 10.

Figure 9:
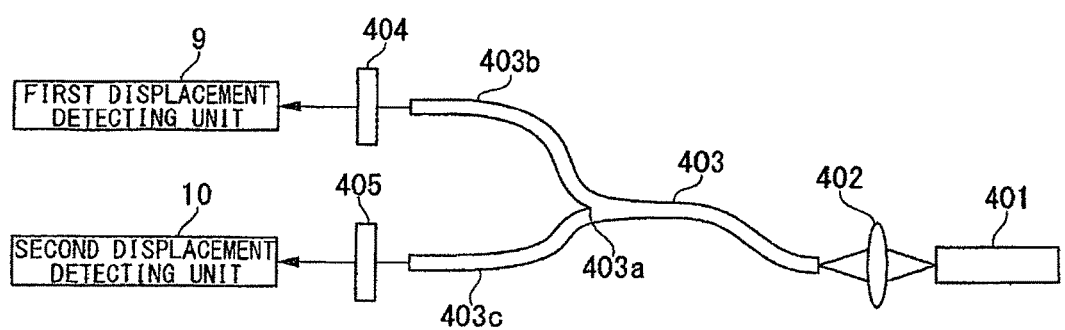
FIG. 9 is an outline configuration diagram showing a modification of the periphery of a light source of the displacement detecting device in the first embodiment example of the present invention.

FIG. 9 is an outline configuration diagram showing the modification of the light source and its periphery.

For the displacement detecting device 1 according to the first embodiment example described above, the example is explained in which the light source 20 is provided in each of the first displacement detecting unit 9 and in the second displacement detecting unit 10, but the example is not limited to this. For example, as shown in FIG. 9, for the first displacement detecting unit 9 and the second displacement detecting unit 10, one light source 401, a lens 402, and an optical fiber 403 are provided. As the optical fiber 403, a multimode fiber may be applied, or a single-mode fiber or a polarization-holding fiber may be applied.

The light emitted from the one light source 401 is condensed by the lens 402 and enters the optical fiber 403. The optical fiber 403 has a branch part 403*a*, a first emission end 403*b*, and a second emission end 403*c*. That is, the emission end side of the optical fiber 403 is branched into two. Then, a first polarization plate 404 is arranged so as to face the first emission end 403*b* and a second polarization plate 405 so as to face the second emission end 403*c*.

The optical fiber 403 branches the incident light into two at the branch part 403*a* and guides the divided lights to the first displacement detecting unit 9 and the second displacement detecting unit 10, respectively. One of the two divided lights is emitted from the first emission end 403*b* and passes through the first polarization plate 404, and then is irradiated to the first displacement detecting unit 9. The other of the two divided lights is emitted from the second emission end 403*c* and passes through the second polarization plate 405, and then is irradiated to the second displacement detecting unit 10.

As described above, by causing the two displacement detecting units 9 and 10 to be irradiated with the light from the one light source 401, it is possible to make the displacement detecting units 9 and 10 share the same temperature change and the long-term change in the characteristics of the light source 401. As a result of that, it is possible to eliminate an error produced by the use of different light sources between the first displacement detecting unit 9 and the second displacement detecting unit 10, and therefore, it is made possible to detect a displacement stably.

In FIG. 9, the example is explained in which light is branched into plurality within the optical fiber 403, but the example is not limited to this and it may also be possible to branch the light emitted from the light source 401 into plurality using a beam splitter etc. The number into which light is branched is not limited to two and in the case where three, four, or more displacement detecting units are provided, the number into which light is branched is appropriately set in accordance with the number of the provided displacement detecting units.

Figure 10:
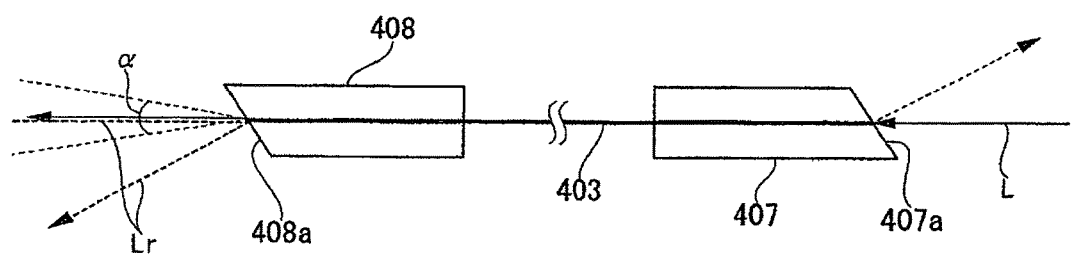
FIG. 10 is an explanatory diagram showing an essential part shown in FIG. 9 in an enlarged manner.

FIG. 10 is an explanatory diagram in which the essential parts shown in FIG. 9 are enlarged.

As shown in FIG. 10, on the incidence port side of the optical fiber 403, an incidence side ferrule 407 is provided and on the emission port side of the optical fiber 403, an emission side ferrule 408 is provided. An incidence end surface 407a of the incidence side ferrule 407 which the light L enters is inclined with respect to the optical axis. An emission end surface 408a of the emission side ferrule 408 which the light L enters is inclined with respect to the optical axis similar to the incidence end surface 407a.

To the emission end surface 408a, returned light Lr that is the light L emitted from the optical fiber 403 and reflected by an optical system enters. Then, the returned light Lr is reflected by the emission end surface 408a. The emission end surface 408a reflects the returned light Lr to the outside of a possibility area a used by light in the optical system. Due to this, it is possible to prevent the returned light Lr from entering the optical system again and from interfering with the light actually used. The optical system referred to here refers to various kinds of parts provided in the displacement detecting unit 9 and the diffraction grating 8.

In FIG. 10, the example is explained in which the emission end surface 408a is inclined with respect to the optical axis, but the example is not limited to this. As is performed conventionally, it may also be possible to prevent the returned light Lr from entering the optical system again by, for example, providing the emission end surface 408a with an anti-reflection film or by using a transparent glass ferrule with less reflection as an emission side ferrule.

It is possible to apply the configuration of the optical fiber shown in FIG. 9 and FIG. 10 to the displacement detecting unit 30 according to the second modification shown in FIG. 8 and the displacement detecting unit 300 according to the third modification shown in FIG. 9, and also to displacement detecting devices 40, 60, 70, 500, and 600 according to other embodiments, to be described later.

2. Second Embodiment Example

Next, with reference to FIG. 11, a displacement detecting device according to a second embodiment example of the present invention is explained.

FIG. 11 is an outline configuration diagram showing a configuration of the displacement detecting device 40 according to the second embodiment example.

The displacement detecting device 40 according to the second embodiment example differs from the displacement detecting device 1 according to the first embodiment example in the numbers of provided displacement detecting units and displacement computing units. Because of this, the same symbols are attached to the parts common to those of the displacement detecting device 1 according to the first embodiment example and duplicated explanation is omitted here.

As shown in FIG. 11, the displacement detecting device 40 includes the scale 2, a detection head 43, a first displacement computing unit 44, a second displacement computing unit 45, a third displacement computing unit 46, a comparing unit 47, and an absolute position computing unit 48, the first to third displacement computing units 46 to 48 being connected to the detection head 43.

The detection head 43 has a first displacement detecting unit 49, a second displacement detecting unit 50, and a third displacement detecting unit 51. The first displacement detecting unit 49 is arranged on one side of the detection head 43 in the measurement direction X1. The third displacement detecting unit 51 is arranged on the other side of the detection head 43 in the measurement direction X1. The second displacement detecting unit 50 is arranged between the first displacement detecting unit 49 and the third displacement detecting unit 51.

The second displacement detecting unit 50 is provided with the predetermined interval W in the measurement direction X1 from the first displacement detecting unit 49. The third displacement detecting unit 51 is provided with the predetermined interval W in the measurement direction X1 from the second displacement detecting unit 50. That is, the first displacement detecting unit 49, the second displacement detecting unit 50, and the third displacement detecting unit 51 are arranged at regular intervals along the measurement direction X1. In the state shown in FIG. 11, the second displacement detecting unit 50 and the third displacement detecting unit 51 face the measurement surface 2a of the scale 2 and the first displacement detecting unit 49 does not face the measurement surface 2a of the scale 2 and is located on one side in the measurement direction X1 beyond the measurement surface 2a.

The first displacement detecting unit 49 is connected to the first displacement computing unit 44 and the second displacement detecting unit 50 is connected to the second displacement computing unit 45. The third displacement detecting unit 51 is connected to the third displacement computing unit 46. The Lissajous signal obtained by the first displacement detecting unit 49 is output to the first displacement computing unit 44 and the Lissajous signal obtained by the second displacement detecting unit 50 is output to the second displacement computing unit 45. The Lissajous signal obtained by the third displacement detecting unit 51 is output to the third displacement computing unit 46.

The first displacement computing unit 44, the second displacement computing unit 45, and the third displacement computing unit 46 are connected to the comparing unit 47 and the absolute position computing unit 48. In the state shown in FIG. 11, the comparing unit 47 compares relative position information output from the second displacement computing unit 45 and that output from the third displacement computing unit 46 and computes absolute position information. The absolute position computing unit 48 computes an absolute position based on the absolute position information output from the comparing unit 47 and the relative position information output from at least one of the second displacement computing unit 45 and the third displacement computing unit 46 and outputs the absolute position.

In the displacement detecting device 40 according to the second embodiment example, when the scale 2 and the detection head 43 move relatively in the measurement direction X1, the first displacement detecting unit 49 having not faced the measurement surface 2a of the scale 2 comes to face the measurement surface 2a of the scale 2. When the scale 2 and the detection head 43 further move relatively in the measurement direction X1, the third displacement detecting unit 51 having faced the measurement surface 2*a* of the scale 2 gets away from the measurement surface 2*a* of the scale 2.

When the third displacement detecting unit 51 gets away from the measurement surface 2*a* of the scale 2 to the other side in the measurement direction X1, pitch displacement detection by the third displacement detecting unit 51 is stopped, and the pitch displacement detection is performed by the first displacement detecting unit 49. Then, the comparing unit 47 compares the relative position information output from the second displacement computing unit 45 and that output from the first displacement computing unit 44 and computes absolute position information. The absolute position computing unit 48 computes an absolute position based on the absolute position information output from the comparing unit 47 and the relative position information output from at least one of the second displacement computing unit 45 and the first displacement computing unit 44 and outputs the absolute position.

When the first displacement detecting unit 49 faces the measurement surface 2*a* of the scale 2, it may also be possible to hand over the pitch displacement detection from the third displacement detecting unit 51 to the first displacement detecting unit 49. Further, it may also be possible to calculate, when all the first displacement detecting unit 49, the second displacement detecting unit 50, and the third displacement detecting unit 51 face the measurement surface 2*a* of the scale 2, an average value of the relative position information of the three displacement detecting units 49, 50, and 51 and to output the calculated average value to the absolute position computing unit 48. In this case, the absolute position computing unit 48 computes an absolute position from the average value of the relative position information of the three displacement detecting units 49, 50, and 51 and the absolute position information of the comparing unit 47 and outputs the absolute position.

As described above, according to the displacement detecting device 40 according to the second embodiment example, it is possible to make the measurable range longer than the length in the measurement direction X1 of the measurement surface 2*a* of the scale 2. Further, at the time of handover from the third displacement detecting unit 51 to the first displacement detecting unit 49, it is possible to detect an accurate position from the absolute position information even if the relative position information is lost.

Other configurations are the same as those of the displacement detecting device 1 according to the first embodiment, and therefore, explanation thereof is omitted. By the displacement detecting device 40 having the configuration as above, it is also possible to obtain the same working and effect as those of the displacement detecting device 1 according to the first embodiment example described above.

For the displacement detecting device 40 according to the second embodiment example, the example is explained in which the first displacement detecting unit 49, the second displacement detecting unit 50, and the third displacement detecting unit 51 are arranged at regular intervals, but the example is not limited to this. For example, it may also be possible to set the interval between the first displacement detecting unit 49 and the second displacement detecting unit 50 different from the interval between the second displacement detecting unit 50 and the third displacement detecting unit 51.

In this case, at the time of handover of the pitch detection from the first displacement detecting unit 49 to the third displacement detecting unit 51, or from the third displacement detecting unit 51 to the first displacement detecting unit 49, it is preferable to transmit the distance information from the second displacement detecting unit 50 to the comparing unit 47.

Further, for the displacement detecting device 40 according to the second embodiment example, the example is explained in which the three displacement detecting units 49, 50, and 51 are provided, but the example is not limited to this and four or more displacement detecting units may be arranged with predetermined intervals along the measurement direction X1. Due to this, it is possible to further extend the measurable range by the displacement detecting device.

3. Third Embodiment Example

Figure 12:
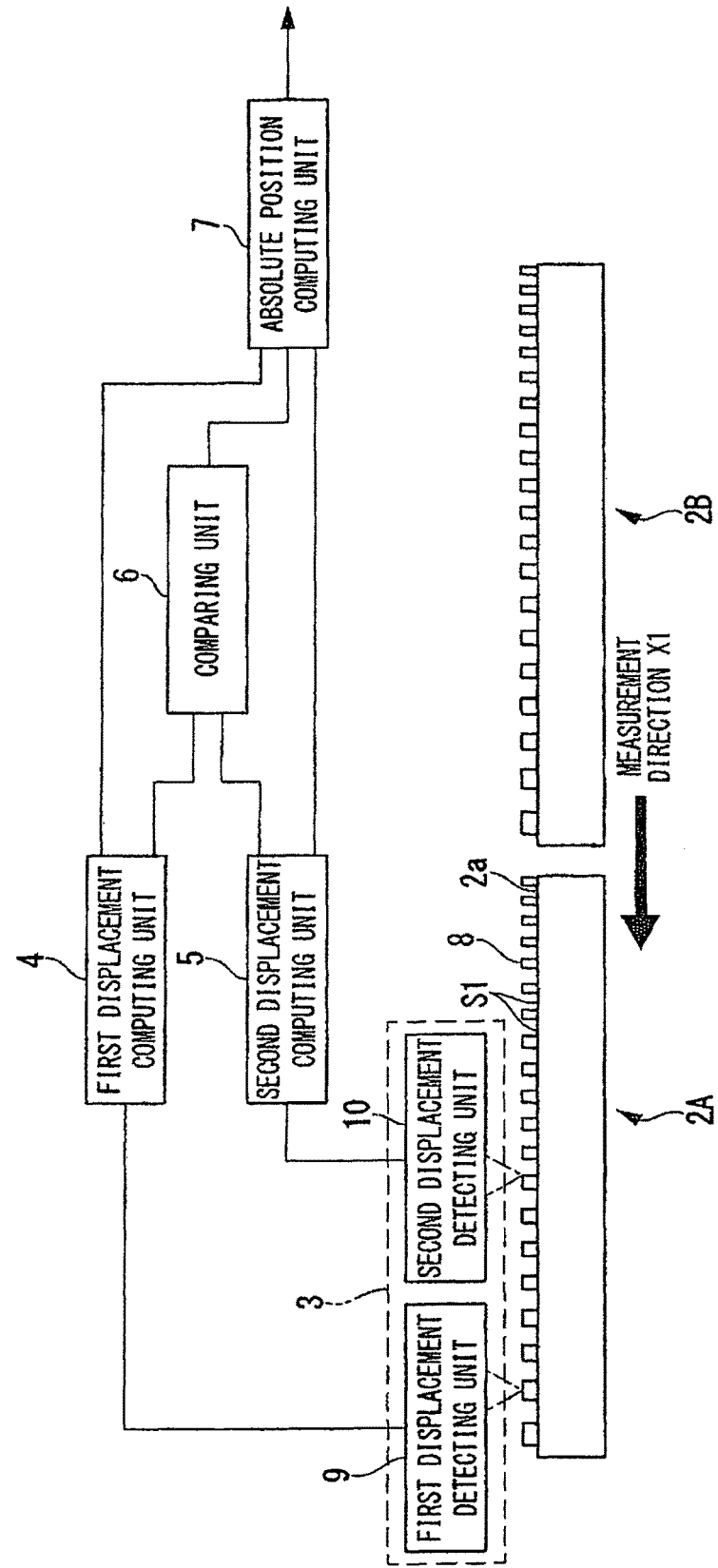
FIG. 12 is an outline configuration diagram showing a configuration of a displacement detecting device in a third embodiment example of the present invention.

Next, with reference to FIG. 12, a displacement detecting device according to a third embodiment example of the present invention is explained.

FIG. 12 is an outline configuration diagram showing a configuration of the displacement detecting device 60 according to the third embodiment example.

The displacement detecting device 60 according to the third embodiment example differs from the displacement detecting device 1 according to the first embodiment example in the number of provided scales. Because of this, the same symbols are attached to the parts common to those of the displacement detecting device 1 according to the first embodiment example and duplicated explanation is omitted here.

As shown in FIG. 12, the displacement detecting device 60 has a first scale 2A, a second scale 2B, the detection head 3, the first displacement computing unit 4 and the second displacement computing unit 5 connected to the detection head 3, the comparing unit 6, and the absolute position computing unit 7. The configurations of the detection head 3, the first displacement computing unit 4 and the second displacement computing unit 5 connected to the detection head 3, the comparing unit 6, and the absolute position computing unit 7 are the same as those of the displacement detecting device 1 according to the first embodiment example, and therefore, explanation thereof is omitted.

As shown in FIG. 12, the first scale 2A and the second scale 2B have the same configuration as that of the scale 2 of the displacement detecting device 1 according to the first embodiment example. The first scale 2A is arranged on one side in the measurement direction X1 and the second scale 2B is arranged on the other side in the measurement direction X1. In the state shown in FIG. 12, the first scale 2A faces the detection head 3 and the second scale 2B does not face the detection head 3.

Here, when the first scale 2A, the second scale 2B, and the detection head 3 move relatively along the measurement direction X1, there is a case where the detection head 3 moves from the first scale 2A to the second scale 2B. At this time, the detection signal is lost temporarily due to the gap between the first scale 2A and the second scale 2B. Because of this, when the detection head 3 moves from the first scale 2A to the second scale 2B, an absolute position is detected based on the absolute position information of the comparing unit 6. Due to this, it is possible to detect an accurate position and at the same time, it is possible to extend the measurable range of the displacement detecting device 60 by a simple configuration.

Other configurations are the same as those of the displacement detecting device 1 according to the first embodiment, and therefore, explanation thereof is omitted. By the displacement detecting device 60 having the configuration as above, it is also possible to obtain the same working and effect as those of the displacement detecting device 1 according to the first embodiment example described above.

For the displacement detecting device 60 according to the third embodiment example, the example is explained in which the two scales 2 are arranged, but the three or more scales 2 may be arranged along the measurement direction X1.

4. Fourth Embodiment Example

Figure 13:
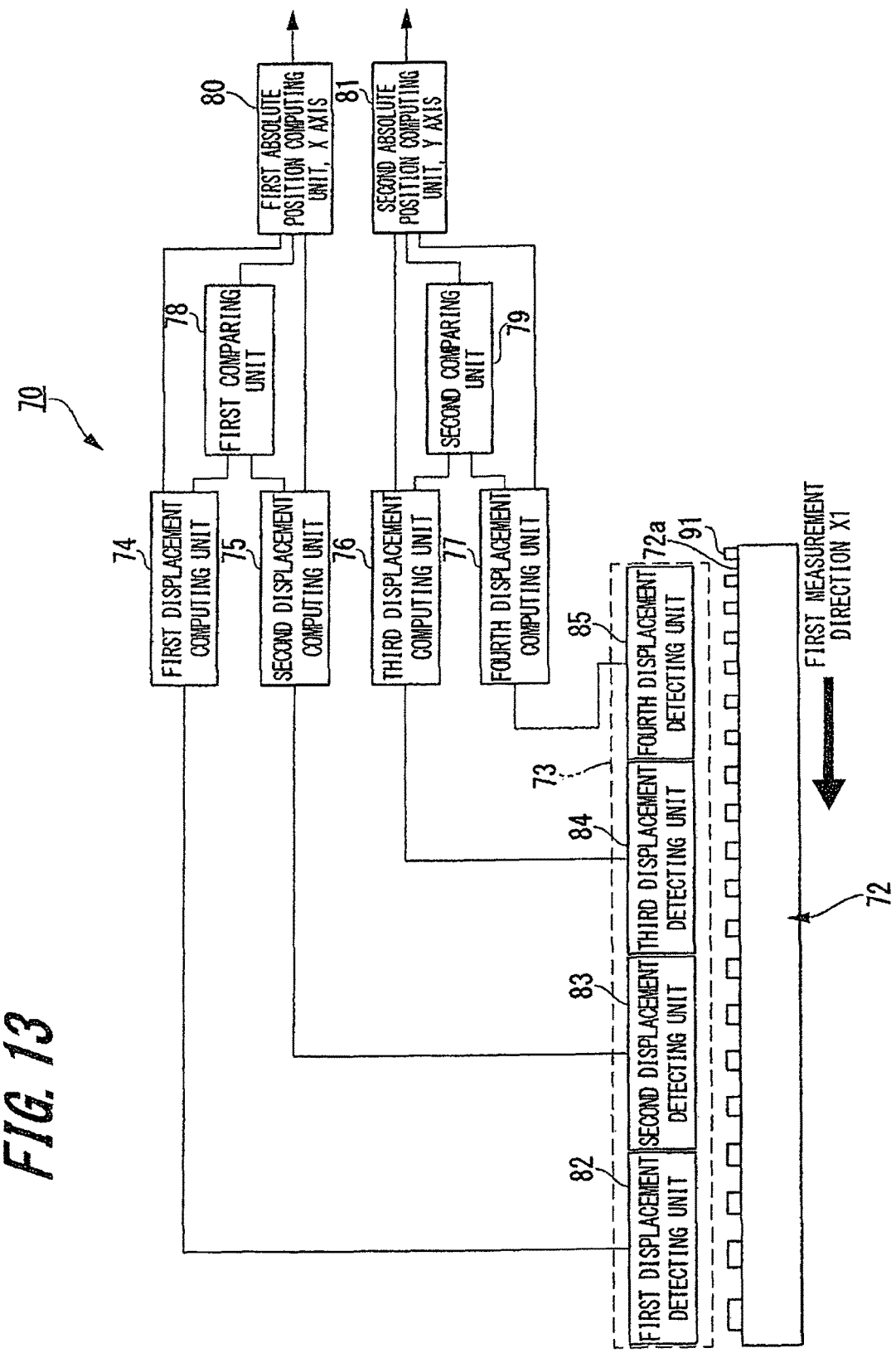
FIG. 13 is an outline configuration diagram showing a configuration of a displacement detecting device in a fourth embodiment example of the present invention.
Figure 14:
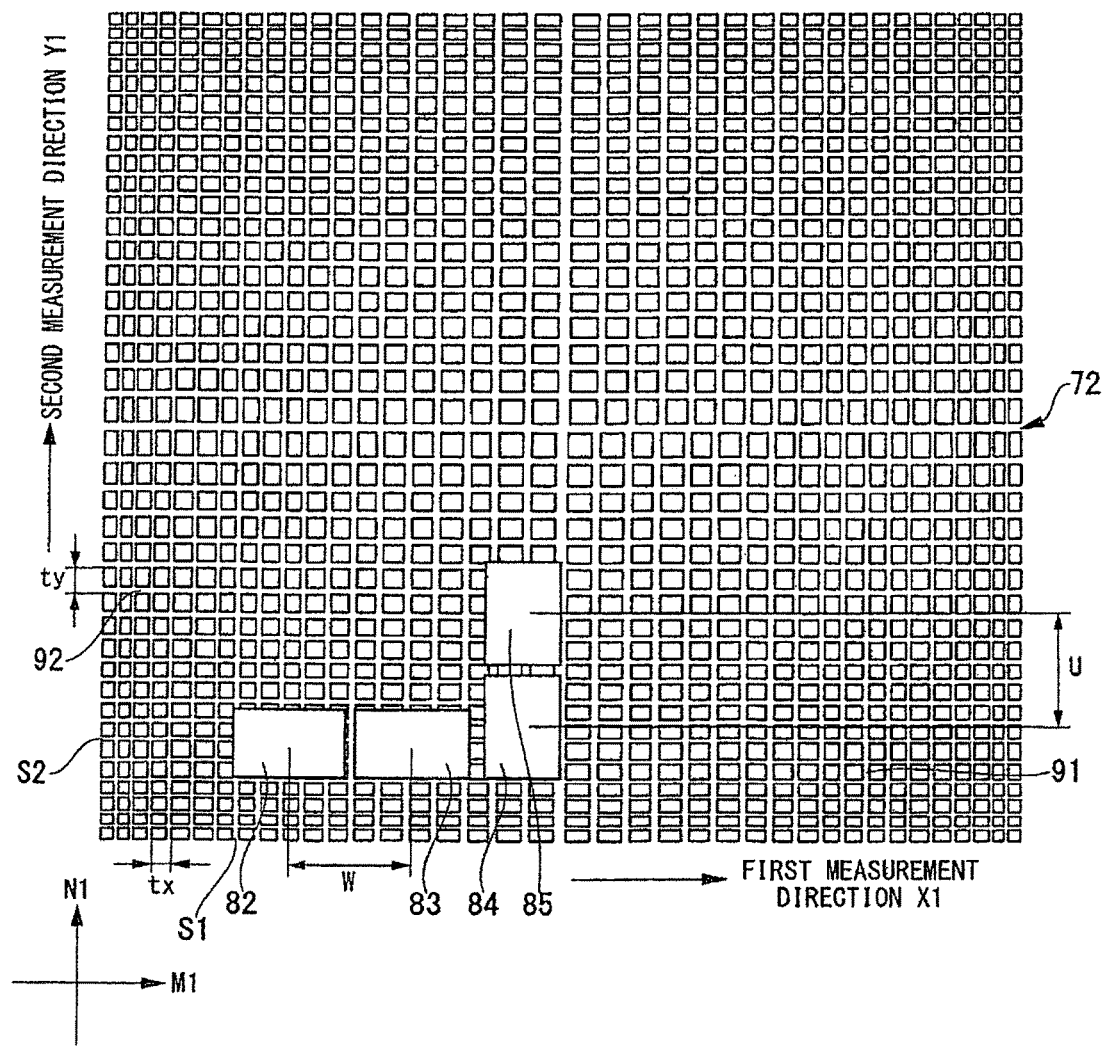
FIG. 14 is an outline configuration diagram in which the configuration of the displacement detecting device in the fourth embodiment example of the present invention is viewed from the front.

Next, with reference to FIG. 13 and FIG. 14, a displacement detecting device according to a fourth embodiment example of the present invention is explained.

FIG. 13 is an outline configuration diagram showing a configuration of the displacement detecting device 70 according to the fourth embodiment example. FIG. 14 is a plan view showing a scale and displacement detecting units of the displacement detecting device 70 according to the fourth embodiment example.

The displacement detecting device 70 according to the fourth embodiment example detects displacement in the first measurement direction X1 and displacement in a second measurement direction Y1 parallel to the measurement surface of the scale and orthogonal to the first measurement direction X1. That is, the displacement detecting device 70 according to the fourth embodiment example is a displacement detecting device capable of detecting two-dimensional (planar) displacement and positions. Here, the same symbols are attached to the parts common to those of the displacement detecting device 1 according to the first embodiment example and duplicated explanation is omitted.

As shown in FIG. 13, the displacement detecting device 70 includes a scale 72, a detection head 73, a first displacement computing unit 74, a second displacement computing unit 75, a third displacement computing unit 76, a fourth displacement computing unit 77, a first comparing unit 78, a second comparing unit 79, a first absolute position computing unit 80, and a second absolute position computing unit 81.

The scale 72 is formed into the shape of substantially a flat plate. On a measurement surface 72*a* of the scale 72, a plurality of first slits S1 extending along the second measurement direction Y1 and a plurality of second slits S2 extending along the first measurement direction X1 are formed. The plurality of first slits S1 forms a first diffraction grating 91 and the plurality of second slits S2 forms a second diffraction grating 92.

That is, the scale 72 according to the fourth embodiment example is a diffraction grating having a grating vector in each of the two directions; the first measurement direction X1 and the second measurement direction Y1.

The first diffraction grating 91 has a first grating vector M1 along the first measurement direction X1. A pitch interval tx in the first diffraction grating 91 changes continuously along the first measurement direction X1 as that in the diffraction grating 8 according to the first embodiment example and the change is set so that coordinates in the first measurement direction X1 can be approximated by expression 1, which is a quadratic polynomial.

The second diffraction grating 92 has a second grating vector N1 along the second measurement direction Y1. A pitch interval ty in the second diffraction grating 92 changes continuously along the second measurement direction Y1 and the change is set so that coordinates in the second measurement direction Y1 can be approximated to a quadratic polynomial. The change in the pitch interval ty in the second diffraction grating 92 is expressed by, for example, expression 4 below as in the case of the first diffraction grating 91.

$$f(y)=ey^2+gy+H \qquad \text{[Expression 4]}$$

Here, y denotes the coordinate in the second measurement direction Y1 and e, g, and H denote coefficients in the case where the pitch interval ty is approximated to a quadratic polynomial.

The detection head 73 has a first displacement detecting unit 82, a second displacement detecting unit 83, a third displacement detecting unit 84, and a fourth displacement detecting unit 85. Then, the position in the first measurement direction X1 is detected by the first displacement detecting unit 82, the second displacement detecting unit 83, the first displacement computing unit 74, the second displacement computing unit 75, the first comparing unit 78, and the first absolute position computing unit 80. The position in the second measurement direction Y1 is detected by the third displacement detecting unit 84, the fourth displacement detecting unit 85, the third displacement computing unit 76, the fourth displacement computing unit 77, the second comparing unit 79, and the second absolute position computing unit 81.

As shown in FIG. 14, the first displacement detecting unit 82 and the second displacement detecting unit 83 are arranged with the predetermined interval W along the inline in the first measurement direction X1. The third displacement detecting unit 84 and the fourth displacement detecting unit 85 are arranged with a predetermined interval U along the inline in the second measurement direction Y1.

The first displacement computing unit 74 computes the first relative position information in the first measurement direction X1 based on the Lissajous signal output from the first displacement detecting unit 82 and outputs the first relative position information. The second displacement computing unit 75 computes the second relative position information in the first measurement direction X1 based on the Lissajous signal output from the second displacement detecting unit 83 and outputs the second relative position information. The third displacement computing unit 76 computes third relative position information in the second measurement direction Y1 based on the Lissajous signal output from the third displacement detecting unit 84 and outputs the third relative position information. The fourth displacement computing unit 77 computes fourth relative position information in the second measurement direction Y1 based on the Lissajous signal output from the fourth displacement detecting unit 85 and outputs the fourth relative position information.

The first comparing unit 78 computes a difference between the first relative position information of the first displacement computing unit 74 and the second relative position information of the second displacement computing unit 75 per unit displacement of the first displacement detecting unit 82 and outputs absolute position information in the first measurement direction X1. Then, the first absolute position computing unit 80 calculates an absolute position in the first measurement direction X1 based on the relative position information of at least one of the first relative position information and the second relative position information and the absolute position information output from the first comparing unit 78 and outputs the absolute position. The method for calculating an absolute position of the scale 72 in the first measurement direction X1 is the same as that in the displacement detecting device 1 according to the first embodiment example described above, and therefore, explanation thereof is omitted here.

The second comparing unit 79 computes a difference between the third relative position information of the third displacement computing unit 76 and the fourth relative position information of the fourth displacement computing unit 77 per unit displacement of the third displacement detecting unit 84 and outputs absolute position information in the second measurement direction Y1. The difference of the second comparing unit 79 can be expressed by, for example, expression 5 below as that of the first comparing unit 78.

$$f(y)-f(y+U)=-2eUy-(eU^2-gU) \quad \text{[Expression 5]}$$

Then, the second absolute position computing unit 81 calculates an absolute position in the second measurement direction Y1 based on the relative position information of at least one of the third relative position information and the fourth relative position information and the absolute position information output from the second comparing unit 79 and outputs the absolute position.

According to the displacement detecting device 70 according to the fourth embodiment example, it is possible to detect the absolute position in the first measurement direction X1 and the absolute position in the second measurement direction Y1 by the one scale 72. Further, the origin mark and the origin signal are not necessary, which are necessary conventionally, and therefore, the measurement range is not limited by the origin mark or the origin signal and it is possible to detect the absolute position on the entire surface of the measurement surface 72a of the scale 72.

Other configurations are the same as those of the displacement detecting device 1 according to the first embodiment, and therefore, explanation thereof is omitted. By the displacement detecting device 70 having the configuration as above, it is also possible to obtain the same working and effect as those of the displacement detecting device 1 according to the first embodiment example described above.

5. Fifth Embodiment Example

Figure 15:
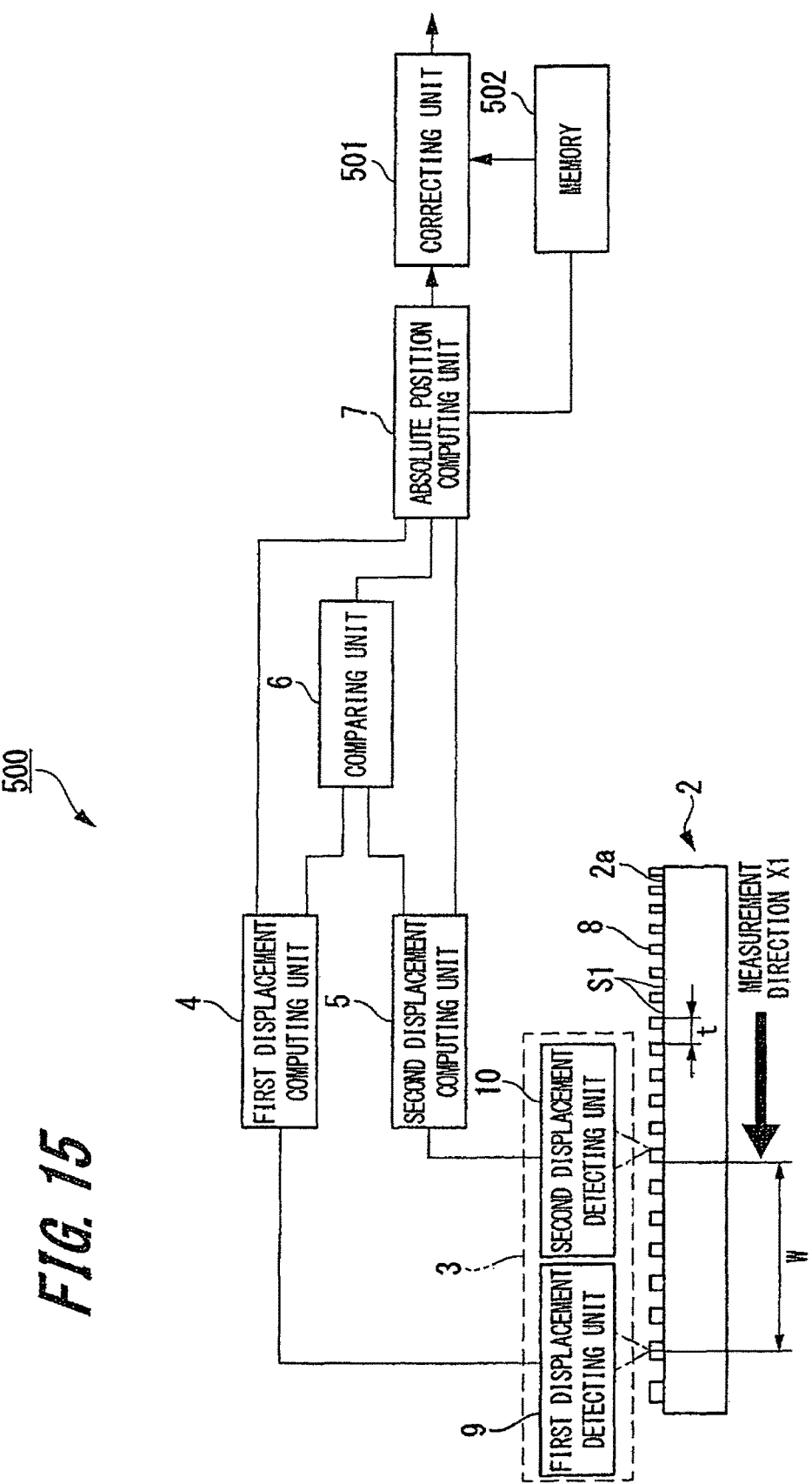
FIG. 15 is an outline configuration diagram showing a configuration of a displacement detecting device in a fifth embodiment example of the present invention.

Next, with reference to FIG. 15 and FIG. 16, a displacement detecting device according to a fifth embodiment example of the present invention is explained.

FIG. 15 is an outline configuration diagram showing a configuration of the displacement detecting device 500 according to the fifth embodiment example. FIG. 16 is a diagram showing an example of a data table stored in a memory of the displacement detecting device 500 according to the fifth embodiment example.

The displacement detecting device 500 according to the fifth embodiment example is the displacement detecting device 1 according to the first embodiment example in which a correcting unit 501 and a memory 502 are provided. Because of this, the correcting unit 501 and the memory 502 are explained and the same symbols are attached to the parts common to those of the displacement detecting device 1 according to the first embodiment example and duplicated explanation is omitted here.

As shown in FIG. 15, the correcting unit 501 is connected to the absolute position computing unit 7. To the correcting unit 501, the absolute position of the detection head 3 with respect to the scale 2 is input from the absolute position computing unit 7. The memory 502 is connected to the absolute position computing unit 7 and the correcting unit 501. Then, the correcting unit 501 corrects the absolute position based on the input absolute position and correction data stored in the memory 502 and outputs the corrected absolute position.

As shown in FIG. 16, in the memory 502, a correction value table is stored. The correction value table specifies correction values used in the correcting unit 501 in accordance with the absolute position of the scale 2. Here, the change in the pitch interval t of the scale 2 produces an error in the expression 1, which is the approximate expression of the above-described quadratic polynomial, due to unevenness in thickness of the scale main body and unevenness in polishing of the measurement surface 2a at the time of creation. Because of this, in the memory 502, correction values to eliminate the error are stored in advance.

Then, the correcting unit 501 acquires a correction value from the correction value table in accordance with the absolute position of the detection head 3 with respect to the scale 2. The correcting unit 501 adds the acquired correction value to the absolute position computed by the absolute position computing unit 7 and thus makes correction.

Due to this, it is possible to correct a minute error that cannot be approximated by the above-described expression 1, and therefore, to perform displacement detection with higher accuracy.

Other configurations are the same as those of the displacement detecting device 1 according to the first embodiment, and therefore, explanation thereof is omitted. By the displacement detecting device 500 having the configuration as above, it is also possible to obtain the same working and effect as those of the displacement detecting device 1 according to the first embodiment example described above.

6. Sixth Embodiment Example

Figure 17:
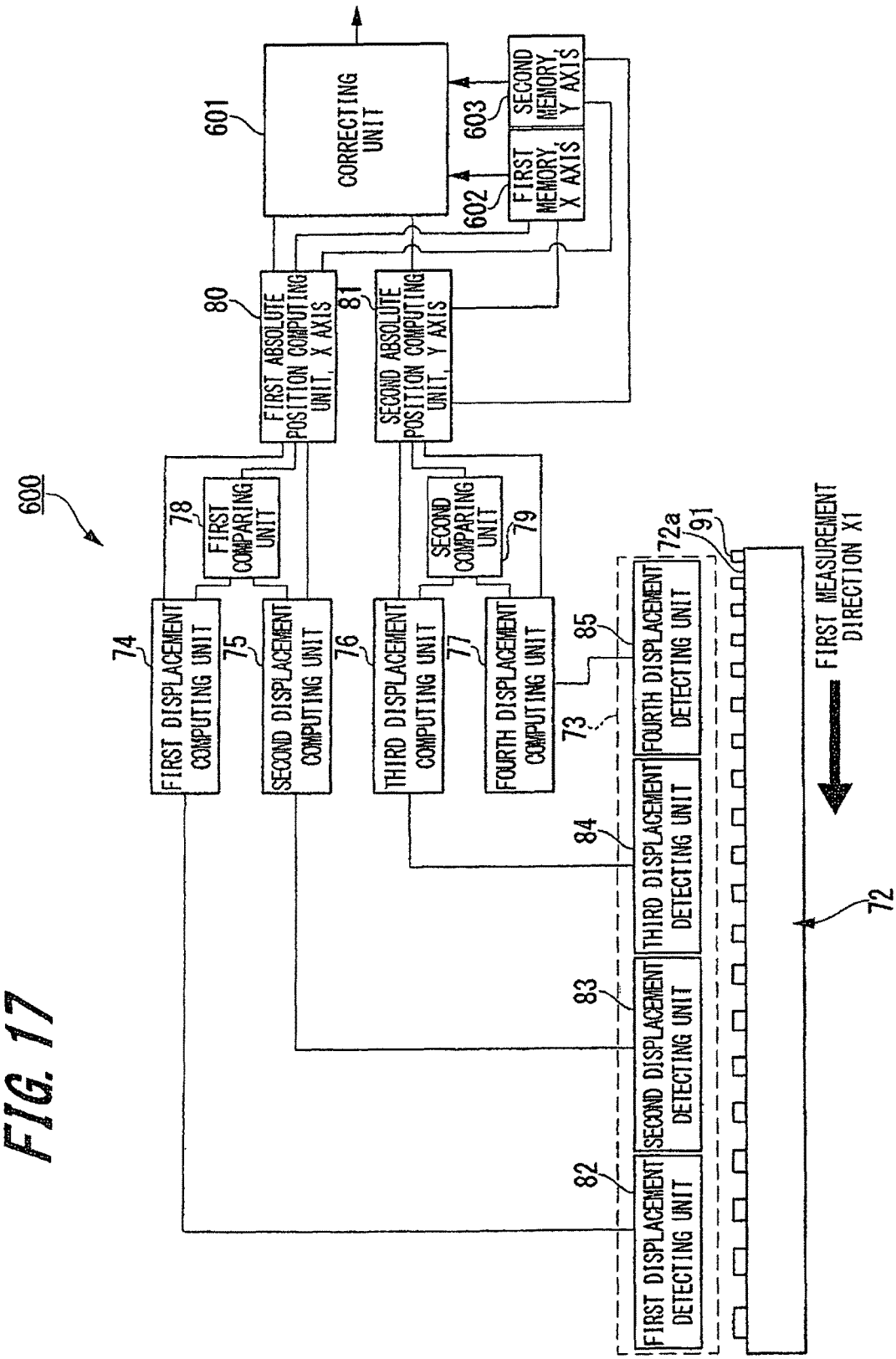
FIG. 17 is an outline configuration diagram showing a configuration of a displacement detecting device in a sixth embodiment example of the present invention.

Next, with reference to FIGS. 17 to 19, a displacement detecting device according to a sixth embodiment example of the present invention is explained.

FIG. 17 is an outline configuration diagram showing a configuration of the displacement detecting device 600 according to the sixth embodiment example. FIG. 18 is a diagram showing an example of a data table stored in a first memory of the displacement detecting device 600 according to the sixth embodiment example. FIG. 19 is a diagram showing an example of a data table stored in a second memory of the displacement detecting device according to the sixth embodiment example.

The displacement detecting device 600 according to the sixth embodiment example is the displacement detecting device 70 according to the fourth embodiment example to which a correcting unit 601, a first memory 602, and a second memory 603 are provided. The correcting unit 601 is the same as the correcting unit 501 of the displacement detecting device 500 according to the fifth embodiment example. Because of this, the correcting unit 601, the first memory 602, and the second memory 603 are explained and the same symbols are attached to the parts common to those of the displacement detecting device 70 according to the fourth embodiment example and duplicated explanation is omitted here.

As shown in FIG. 17, the correcting unit 601 is connected to the first absolute position computing unit 80 and the second absolute position computing unit 81. The first memory 602 and the second memory 603 are connected to the first absolute position computing unit 80, the second absolute position computing unit 81, and the correcting unit 601. To the correcting unit 601, the absolute position in the first measurement direction X1 is input from the first absolute position computing unit 80 and the absolute position in the second measurement direction Y1 is input from the second absolute position computing unit 81.

As shown in FIG. 18, in the first memory 602, a correction value table in the first measurement direction X1 is stored. The correction value table in the first measurement direction X1 specifies correction values in the first measurement direction X1 in accordance with the absolute position in the first measurement direction X1 and the absolute position in the second measurement direction Y1 of the scale 72.

As shown in FIG. 19, in the second memory 603, a correction value table in the second measurement direction Y1 is stored. The correction value table in the second measurement direction Y1 specifies correction values in the second measurement direction Y1 in accordance with the absolute position in the first measurement direction X1 and the absolute position in the second measurement direction Y1 of the scale 72.

As shown in FIG. 17, the correcting unit 601 acquires a correction value in the first measurement direction X1 and a correction value in the second measurement direction Y1 from the first memory 602 and the second memory 603 in accordance with the input absolute position in the first measurement direction X1 and in the second measurement direction Y1 of the detection head 73 with respect to the scale 72. Then, the correcting unit 601 adds the acquired correction values to the absolute position computed by the first absolute position computing unit 80 and the second absolute position computing unit 81 and thus makes correction.

Other configurations are the same as those of the displacement detecting device 1 according to the first embodiment, and therefore, explanation thereof is omitted. By the displacement detecting device 600 having the configuration as above, it is also possible to obtain the same working and effect as those of the displacement detecting device 1 according to the first embodiment example described above.

7. Modification of Scale

Next, with reference to FIG. 20A to FIG. 26, modifications of the scale are explained.

The scales shown in FIG. 20A to FIG. 24 are each a scale having a diffraction grating having two grating vectors, i.e. the first grating vector M1 and the second grating vector N1 along the first measurement direction X1 and the second measurement direction Y1.

[First Modification]

Figure 20A:
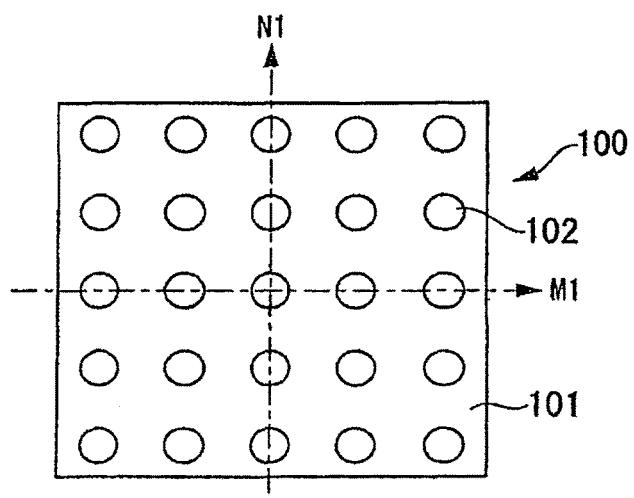
FIGS. 20A and 20B show a first modification of the scale of the displacement detecting device in the embodiment example of the present invention, where
Figure 20B:
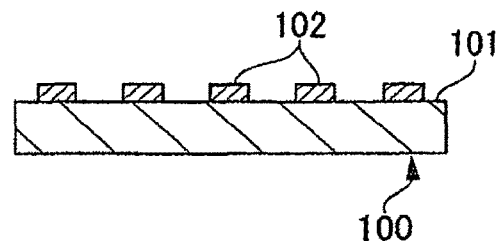

FIG. 20A is an enlarged plan view of a scale according to a first modification and FIG. 20B is an enlarged section view of the scale according to the first modification.

As shown in FIG. 20A and FIG. 20B, a scale 100 according to the first modification is provided with a plurality of protrusions 102 in the shape of substantially a cylinder protruding substantially vertically from one surface of a substrate 101. The plurality of protrusions 102 is arranged in the form of a grating with an interval along the first grating vector M1 and the second grating vector N1.

[Second Modification]

Figure 21A:
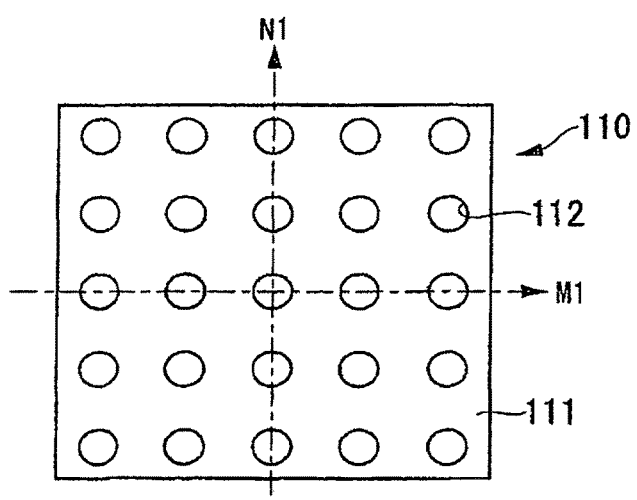
FIGS. 21A and 21B show a second modification of the scale of the displacement detecting device in the embodiment example of the present invention, where
Figure 21B:
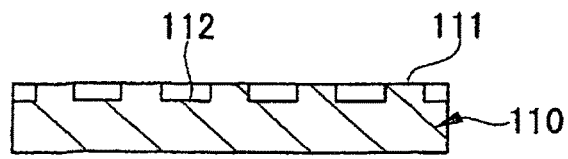

FIG. 21A is an enlarged plan view of a scale according to a second modification and FIG. 21B is an enlarged section view of the scale according to the second modification.

As shown in FIG. 21A and FIG. 21B, a scale 110 according to the second modification is provided with a plurality of recesses 112 recessed into the shape of substantially a cylinder from one surface of a substrate 111. The plurality of recesses 112 is arranged in the form of a grating with an interval along the first grating vector M1 and the second grating vector N1. In this scale 110, gaps formed between the plurality of recesses 112 form slits of the grating.

[Third Modification]

Figure 22A:
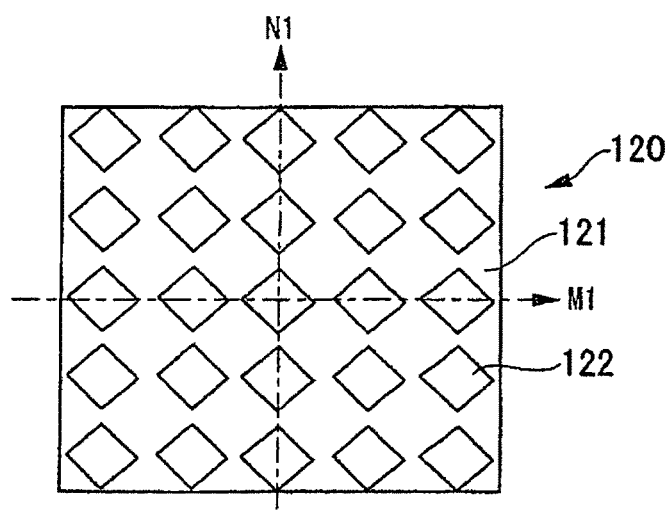
FIGS. 22A and 22B show a third modification of the scale of the displacement detecting device in the embodiment example of the present invention, where
Figure 22B:
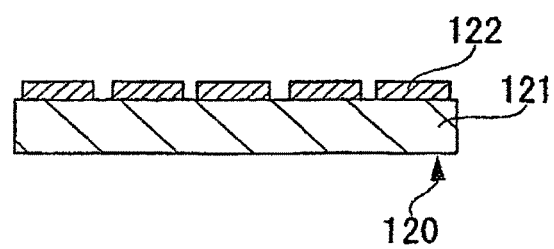

FIG. 22A is an enlarged plan view of a scale according to a third modification and FIG. 22B is an enlarged section view of the scale according to the third modification.

As shown in FIG. 22A and FIG. 22B, a scale 120 according to the third modification is provided with a plurality of protrusions 122 in the shape of substantially a quadrangular prism protruding substantially vertically from one surface of a substrate 121. The plurality of protrusions 122 is arranged in the form of a grating with an interval along the first grating vector M1 and the second grating vector N1.

As shown in FIG. 22A, the surface orientation of two side parts facing each other of the plurality of protrusions 122 is inclined with respect to the first grating vector M1 and the second grating vector N1.

[Fourth Modification]

Figure 23A:
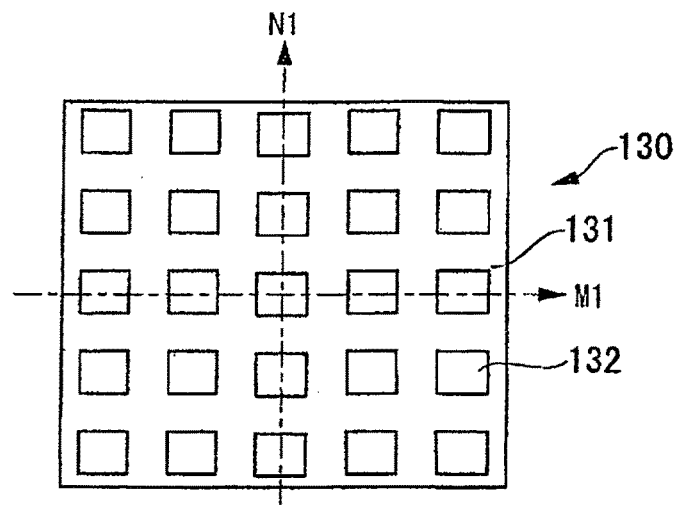
FIGS. 23A and 23B show a fourth modification of the scale of the displacement detecting device in the embodiment example of the present invention, where
Figure 23B:
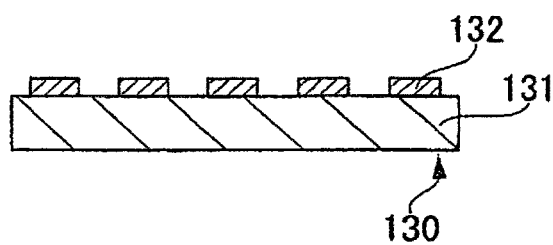

FIG. 23A is an enlarged plan view of a scale according to a fourth modification and FIG. 23B is an enlarged section view of the scale according to the fourth modification.

As shown in FIG. 23A and FIG. 23B, a scale 130 according to the fourth modification is provided with a plurality of protrusions 132 in the shape of substantially a quadrangular prism protruding substantially vertically from one surface of a substrate 131. The plurality of protrusions 132 is arranged in the form of a grating with an interval along the first grating vector M1 and the second grating vector N1.

As shown in FIG. 23A, the plurality of protrusions 132 is arranged so that the surface orientations of two side parts facing each other are along the first grating vector M1 and the second grating vector N1, respectively.

[Fifth Modification]

Figure 24:
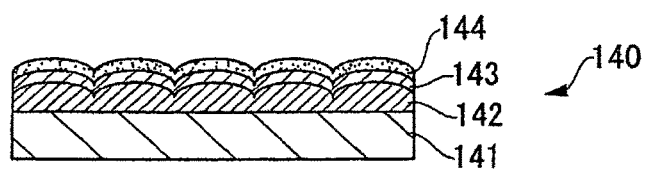
FIG. 24 is an enlarged section view showing a fifth modification of the scale of the displacement detecting device in the embodiment example of the present invention.

FIG. 24 is an enlarged section view of a scale according to a fifth modification.

In the scales 100, 120, and 130 according to the first modification, the third modification, and the fourth modification described above, the section shapes of the protrusions 102, 122, and 132 are formed into the shape of a rectangle. However, the section shapes of the protrusions 102, 122, and 132 are not limited to the shape of a rectangle. For example, in a scale 140 shown in FIG. 24, a protrusion 142 the section shape of which is formed into the shape of a sinusoidal wave protrudes from one surface of a substrate 141.

On the surface of the protrusion 142 of the scale 140, a reflective film 143 is formed. As the material of the reflective film 143, mention is made of, for example, gold (Au), silver (Ag), aluminum (Al), chromium (Cr), etc. By providing the reflective film 143, it is possible to increase the diffraction efficiency. It may also be possible to provide a reflective film on the surface in the scales 100 to 130 according to the first to fourth modifications.

Further, on the reflective film 143 of the scale 140, a protective layer 144 is formed. As the material of the reflective layer 144, mention is made of, for example, silicon dioxide ($SiO_2$), carbon (C), $MgF_2$ (magnesium fluoride), Ti (titanium), etc. The protective layer 144 is formed by, for example, vapor deposition, sputtering, CVD, etc. By providing the protective layer 144, it is possible to improve handleability of the scale. It may also be possible to provide a protective layer on the surface in the scales 100 to 130 according to the first to fourth modifications.

As the material of the substrates 101 to 141 of the scales 100 to 140 described above, ceramic, glass, metal, resin, etc., are used. It may also be possible to form the protrusions 102, 122, 132, and 142, and the recess 112 of the scales 100 to 140 described above by etching a metal film, such as chromium, or by imprinting with silicon, epoxy resin, etc. Further, the protrusions 102, 122, 132, and 142 and the recess 112 of the scales 100 to 140 described above may be a gelatinous material, such as a photographic dry plate.

[Sixth Modification]

Figure 25:
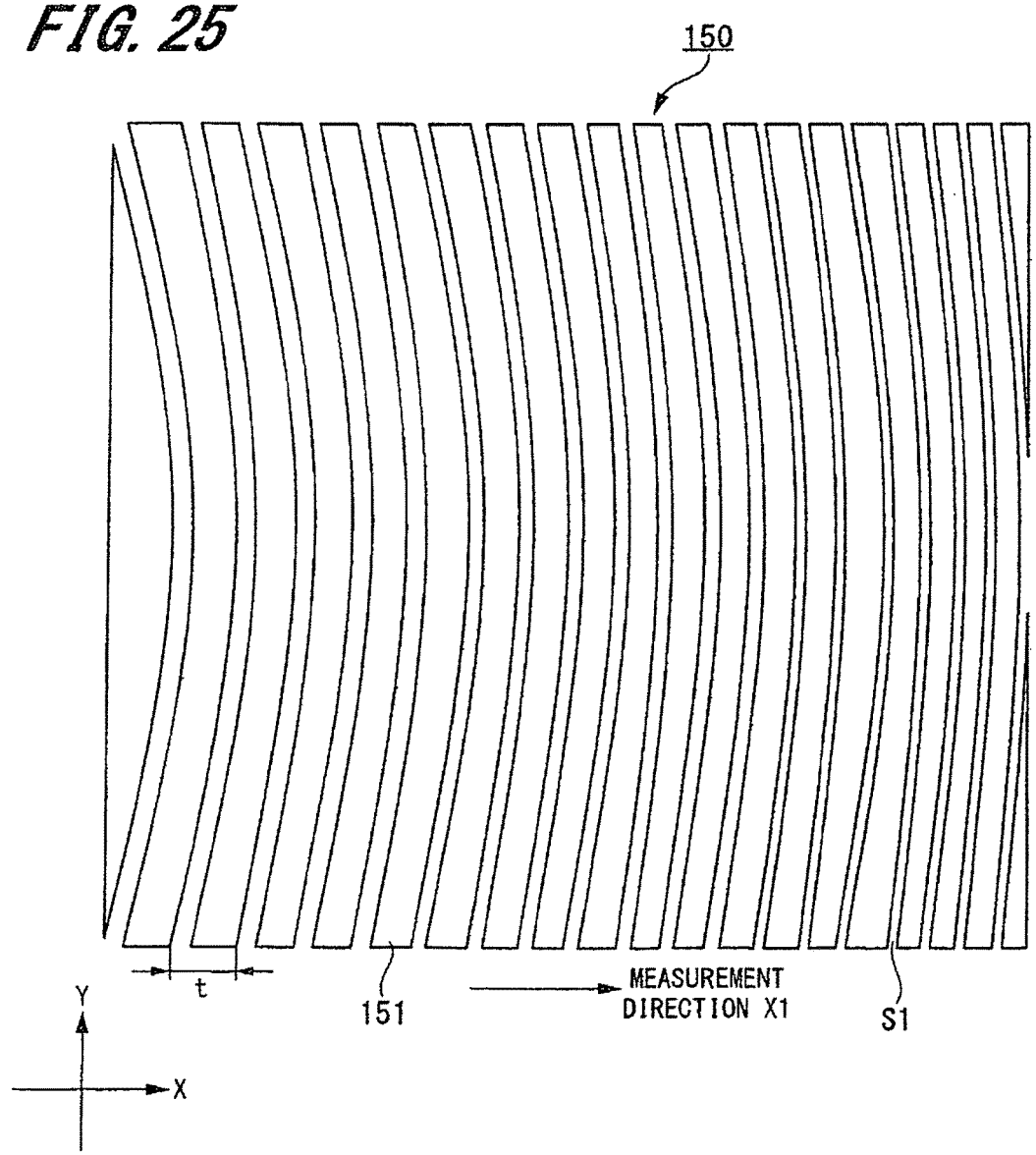
FIG. 25 is a plan view showing a sixth modification of the scale of the displacement detecting device in the embodiment example of the present invention.

FIG. 25 is a plan view showing a scale according to a sixth modification.

The grating vectors of the scales 2, 72, 100, 110, 120, 130, and 140 described above are provided along the measurement direction, but the grating vectors are not limited thereto. For example, the grating vector of a diffraction grating 151 of a scale 150 shown in FIG. 25 changes continuously in the direction parallel to the measurement surface and orthogonal to the measurement direction X1. That is, the plurality of slits S1 forming the diffraction grating 151 is formed into the shape of substantially an arc with an interval along the measurement direction X1.

It is possible to approximate the pitch interval t in the diffraction grating 151 to a quadratic polynomial. It is possible to express the change in the pitch interval t for the coordinate in a first direction X, which is the direction along the measurement direction X1, and the coordinate in a second direction Y orthogonal to the first direction X and parallel to the measurement surface by expression 6 below.

$$f(x,y)=A+Bx+Cx^2+Dy+Ey^2 \quad \text{[Expression 6]}$$

A, B, C, D, and E denote coefficients of the expression 6.

Because of this, also in the case where the scale 150 moves in the second direction Y parallel to the measurement surface and orthogonal to the measurement direction X1, the pitch interval t changes. In the scale 150 as above, by storing information indicative of a relationship between differences in the pitch interval t and the measurement positions of the scale in the comparing unit, it is possible to calculate the absolute position with respect to the scale 150.

[Seventh Modification]

Figure 26:
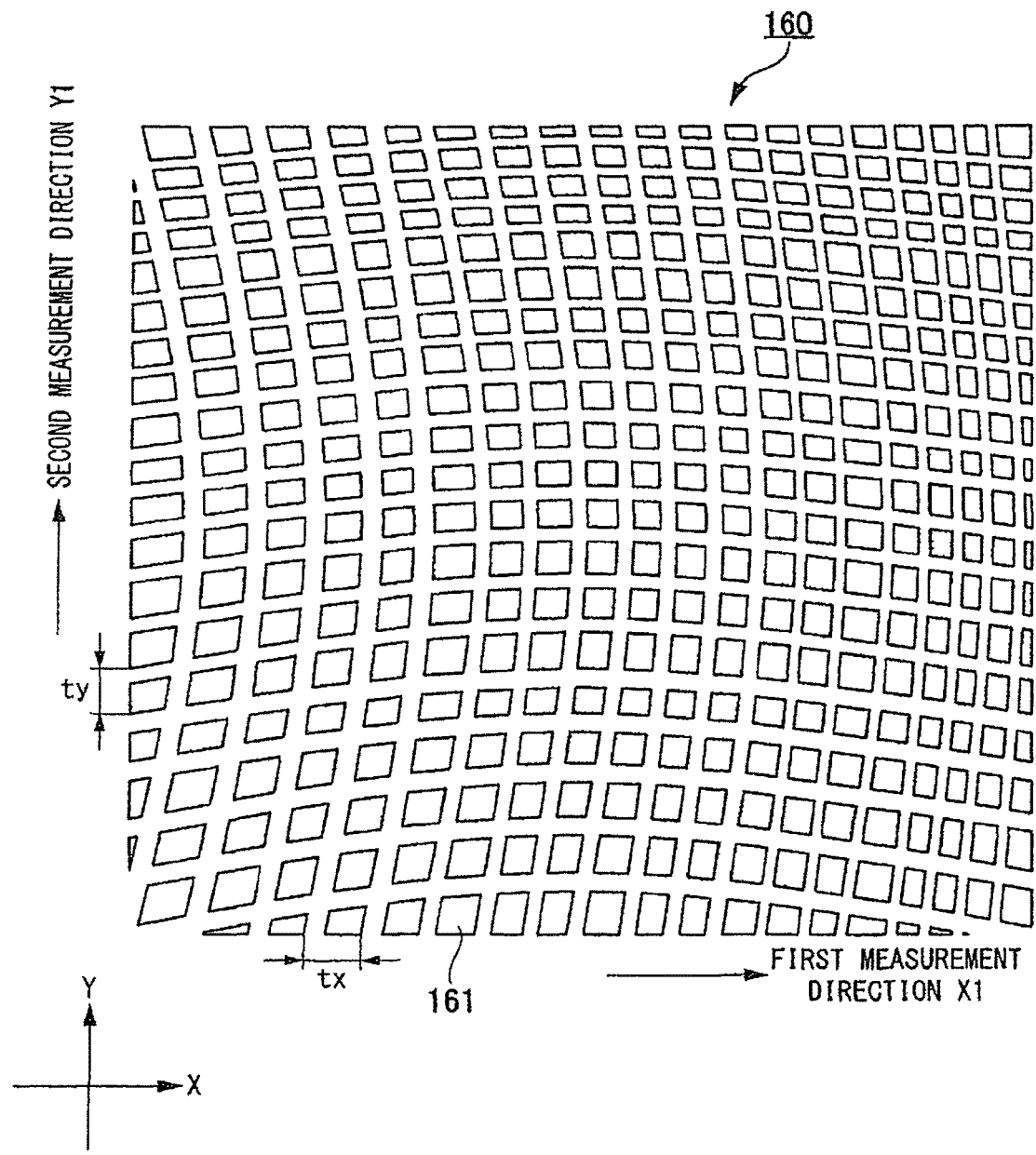
FIG. 26 is a plan view showing a seventh modification of the scale of the displacement detecting device in the embodiment example of the present invention.

FIG. 26 is a plan view showing a scale according to a seventh modification.

As shown in FIG. 26, a diffraction grating 161 in a scale 160 according to the seventh modification has two grating vectors along the first measurement direction X1 and the second measurement direction Y1. The first grating vector formed along the first measurement direction X1 changes continuously in the second direction Y. The second grating vector formed along the second measurement direction Y1 changes continuously in the first direction X.

It is possible to represent approximate expressions expressing the change in the pitch intervals tx and ty for the coordinates in the first direction X and the second direction Y of the scale 160 by the expression 6, respectively.

By the displacement detecting device including the scales 150 and 160 having the configuration as above, it is also possible to obtain the same working and effect as those of the displacement detecting device 1 including the scale 2 according to the first embodiment example described above and the displacement detecting device 70 including the scale 72 according to the fourth embodiment example.

The present invention is not limited to the embodiments described above and shown in the drawings and there can be various modification embodiments within the scope not deviating from the gist of the invention described in the claims. For example, in the embodiment examples described above, the example is explained in which the optical displacement detecting device is used as the displacement detecting device, but the example is not limited to this and the embodiment examples can also be applied to a magnetic displacement detecting device.

It should be understood by those skilled in the art that various modifications, combinations, sub-combinations and alterations may occur depending on design requirements and other factors insofar as they are within the scope of the appended claims or the equivalents thereof.

What is claimed is:

1. A displacement detecting device comprising:
   a scale having marks whose pitch interval is approximated to a quadratic or higher-order polynomial along a measurement direction, or changes randomly;
   a first displacement detecting unit that is arranged facing the scale and detects a displacement in the measurement direction;
   a second displacement detecting unit that is arranged facing the scale and with a predetermined distance in the measurement direction from the first displacement detecting unit, and detects a displacement in the measurement direction;
   a first displacement computing unit that outputs first relative position information based on the displacement in the measurement direction detected by the first displacement detecting unit;
   a second displacement computing unit that outputs second relative position information based on the displacement in the measurement direction detected by the second displacement detecting unit;
   a comparing unit that calculates a difference between the first relative position information and the second relative position information per unit displacement in a position where the first displacement detecting unit is arranged, calculates absolute position information with respect to the measurement direction of the scale based on the calculated difference, and outputs the absolute position information; and
   an absolute position computing unit that computes an absolute position in the measurement direction with respect to the scale based on the absolute position information from the comparing unit and the relative position information of at least one of the first relative position information and the second relative position information and outputs the absolute position,
   wherein
   in the comparing unit, information indicative of a relationship between difference information between the first relative position information and the second relative position information per unit displacement in a position where the first displacement detecting unit is arranged and absolute position information of the scale is stored, and
   the comparing unit calculates the absolute position information based on the calculated difference and the stored information.

2. The displacement detecting device according to claim 1, wherein
   the absolute position computing unit corrects the relative position information of at least one of the first relative position information and the second relative position information based on the absolute position information.

3. The displacement detecting device according to claim 1, wherein the comparing unit outputs the absolute position information to the absolute position computing unit when the calculated absolute position information reaches a specified value.

4. The displacement detecting device according to claim 1, wherein the absolute position computing unit takes the absolute position information calculated by the comparing unit to be displacement information of at least a most significant digit of the absolute position to be output.

5. The displacement detecting device according to claim 1, further comprising an average value computing unit that calculates an average value of the first relative position information and the second relative position information and outputs the average value to the absolute position computing unit, wherein
the absolute position computing unit computes the absolute position based on the average value and the absolute position information.

6. The displacement detecting device according to claim 1, wherein
in the scale, a direction of a grating vector formed by the pitch changes continuously in a direction orthogonal to the measurement direction and parallel to a measurement surface of the scale.

7. The displacement detecting device according to claim 1, further comprising:
a memory in which a correction value table that specifies a correction value in accordance with the absolute position is stored; and
a correcting unit that corrects the absolute position computed by the absolute position computing unit using the correction value specified by the correction value table.

8. The displacement detecting device according to claim 1, comprising:
a light source that emits light to the first displacement detecting unit or the second displacement detecting unit; and
an optical fiber that guides light emitted from the light source to the first displacement detecting unit or the second displacement detecting unit, wherein
an end surface on the emission side from which the light is emitted in the optical fiber is provided and light reflected by the end surface and light emitted from the end surface do not overlap.

9. The displacement detecting device according to claim 1, wherein
the first displacement detecting unit and the second displacement detecting unit share one light source and light is distributed from the shared one light source.

10. The displacement detecting device according to claim 9, comprising an optical fiber that guides light emitted from the light source to the first displacement detecting unit and the second displacement detecting unit, wherein
the optical fiber has:
a branch part at which the light branches into two;
a first emission end from which one of the branched lights is emitted toward the first displacement detecting unit; and
a second emission end from which the other of the branched lights is emitted toward the second displacement detecting unit.

11. The displacement detecting device according to claim 1, wherein
the scale has second marks whose pitch interval is approximated to a quadratic or higher-order polynomial along a second measurement direction orthogonal to the measurement direction and parallel to a measurement surface, or changes randomly.

* * * * *